US012785128B2

(12) United States Patent
Kucernak et al.

(10) Patent No.: US 12,785,128 B2
(45) Date of Patent: Nov. 3, 2026

(54) REDOX FLOW BATTERY

(71) Applicant: IP2IPO Innovations Limited, London (GB)

(72) Inventors: Anthony Kucernak, London (GB); Javier Rubio-Garcia, London (GB)

(73) Assignee: IP2IPO Innovations Limited, London (GB)

( * ) Notice: Subject to any disclaimer, the term of this patent is extended or adjusted under 35 U.S.C. 154(b) by 207 days.

(21) Appl. No.: 17/297,792

(22) PCT Filed: Nov. 28, 2019

(86) PCT No.: PCT/GB2019/053373
§ 371 (c)(1),
(2) Date: May 27, 2021

(87) PCT Pub. No.: WO2020/109807
PCT Pub. Date: Jun. 4, 2020

(65) Prior Publication Data

US 2022/0029188 A1 Jan. 27, 2022

(30) Foreign Application Priority Data

Nov. 29, 2018 (GB) ..................................... 1819459

(51) Int. Cl.
*H01M 8/18* (2006.01)
*H01M 4/92* (2006.01)
*H01M 8/103* (2016.01)

(52) U.S. Cl.
CPC ............ *H01M 8/188* (2013.01); *H01M 4/92* (2013.01); *H01M 8/103* (2013.01)

(58) Field of Classification Search
CPC ......... H01M 8/188; H01M 8/103; H01M 4/92
See application file for complete search history.

(56) References Cited

U.S. PATENT DOCUMENTS

| | | | | |
|---|---|---|---|---|
| 6,143,443 A * | 11/2000 | Kazacos | H01M 10/36 429/188 |
| 2014/0370405 A1 | 12/2014 | Zhang et al. | |
| 2015/0243991 A1 * | 8/2015 | Huskinson | H01M 8/083 429/105 |
| 2015/0263371 A1 | 9/2015 | Stahl et al. | |

(Continued)

FOREIGN PATENT DOCUMENTS

| | | |
|---|---|---|
| CN | 102035007 | 4/2011 |
| CN | 106654331 | 5/2017 |

(Continued)

OTHER PUBLICATIONS

Marshak, Michael P., et al. "Applications of quinone redox chemistry for flow batteries." 224th ECS Meeting. Retrieved from https://ecs.confex.com/ecs/224/webprogram/Paper24639.html. 2013. (Year: 2013).*

(Continued)

*Primary Examiner* — James Lee
(74) *Attorney, Agent, or Firm* — Andrus Intellectual Property Law, LLP

(57) ABSTRACT

A redox flow battery comprising a gaseous anolyte and, as a catholyte, an organic redox active species having at least one electron directing moiety, wherein the organic redox active species is not unsubstituted parabenzoquinone.

20 Claims, 11 Drawing Sheets

(56) References Cited

U.S. PATENT DOCUMENTS

| | | | | |
|---|---|---|---|---|
| 2016/0043423 | A1 | 2/2016 | Huskinson et al. | |
| 2017/0187060 | A1 | 6/2017 | Narayan et al. | |
| 2018/0053957 | A1 | 2/2018 | Pez et al. | |
| 2018/0097249 | A1 | 4/2018 | Narayan et al. | |
| 2018/0190991 | A1 | 7/2018 | Hanafusa et al. | |
| 2018/0241065 | A1 | 8/2018 | Schubert et al. | |
| 2018/0269513 | A1 | 9/2018 | Kaku et al. | |
| 2018/0269516 | A1* | 9/2018 | Wang | H01M 8/186 |
| 2018/0366759 | A1 | 12/2018 | Brandon et al. | |
| 2019/0393506 | A1* | 12/2019 | Hartwig | C07C 46/08 |

FOREIGN PATENT DOCUMENTS

| | | | |
|---|---|---|---|
| CN | 106654333 | | 5/2017 |
| CN | 108475802 | A | 8/2018 |
| EP | 3240084 | | 11/2017 |
| EP | 3322011 | | 5/2018 |
| WO | 2013104664 | | 7/2013 |
| WO | 2015019973 | A1 | 2/2015 |
| WO | 2015048550 | | 4/2015 |
| WO | 2015148357 | | 10/2015 |
| WO | 2017067992 | | 4/2017 |
| WO | 2017103578 | | 6/2017 |
| WO | 2017124112 | | 7/2017 |
| WO | 2018146342 | | 8/2018 |

OTHER PUBLICATIONS

Huskinson, B., et al. "Novel Quinone-Based Couples for Flow Batteries." ECS Transactions, vol. 53, No. 7, May 2, 2013, pp. 101-105, https://doi.org/10.1149/05307.0101ecst. (Year: 2013).*

Likit-Anurak, Kris, et al. "The performance and efficiency of organic electrolyte redox flow battery prototype." Energy Procedia 118 (2017): 54-62. https://doi.org/10.1016/j.egypro.2017.07.012. (Year: 2017).*

Combined Examination and Search Report for UK Patent Application No. GB1819459.7, mailed Jun. 3, 2019.

International Search Report for PCT Patent Application No. PCT/GB2019/053373, mailed Feb. 4, 2020.

Dargily, Neethu Christudas et al. "A Rechargeable Hydrogen Battery", The Journal of Physical Chemistry Letters, 2018, vol. 9, pp. 2492-2497. Retrieved via Imperial College of London on Mar. 4, 2019.

Hoober-Burkhardt, Lena et al. "A New Michael-Reaction-Resistant Benzoquinone for Aqueous Organic Redox Flow Batteries", Journal of The Electrochemical Society, vol. 164 (4), pp. A600-A607, retrieved from https://opscience.iop.org/article/10.1149/2.0351704jes/pdf on May 24, 2021.

Nawar, Saraf et al. "Benzoquinone-Hydroquinone Couple for Flow Battery", Harvard University, MRS Proceedings 1491, published Jan. 2013, retrieved from https://dash.harvard.edu/bitstream/handle/1/27417435/mja233.pdf?sequence=1&isAllowed=y on May 24, 2021.

Wang, Wei et al. "Anthraquinone With Tailored Structure for a Nonaqueous Metal-Organic Redox Flow Battery", Chemical Communications, vol. 48(53), pp. 6669-6671, published May 8, 2012, retrieved from https://www.researchgate.net/publication/225068841_Anthraquinone_with_tailored_structure_for_a_nonaqueous_metal-organic_redox_flow_battery on May 24, 2021.

Janoschka, Tobias et al. "An Aqueous, Polymer-Based Redox-Flow Battery Using Non-Corrosive, Safe, and Low-Cost Materials", Nature, vol. 527, pp. 78-81, published Oct. 21, 2015, retrieved from file://tsr-od-cifs-01/3101users$/jillj/Downloads/Janoschka_et_al-2015-Nature.pdf on May 25, 2021.

Liang et al., "Carbon-Based Electrochemical Oxygen Reduction and Hydrogen Evoluation Catalysts", Carbon-Based Metal-Free Catalysts: Design and Applications, First Edition, 2018 WileyVCH Verlag Gmbh & Co. KGaA, pp. 403-455.

Doyle, R.L., Lyons, M.E.G., "The Oxygen Evolution Reaction: Mechanistic Concepts and Catalyst Design. In: Giménez, S., Bisquert, J. (eds) Photoelectrochemical Solar Fuel Production," 2016 Springer International Publishing, pp. 41-104.

Wenchao Sheng et al, "Hydrogen Oxidation and Evolution Reaction Kinetics on Platinum: Acid vs Alkaline Electrolytes," 2010 J. Electrochem. Soc. 157 B1529.

Communication Pursuant to Article 94(3) EPC for European Patent Appl. No. 19816854.4, dated Jan. 23, 2025.

* cited by examiner

REDOX FLOW BATTERY

CROSS-REFERENCE TO RELATED APPLICATIONS

This application is the U.S. national stage application of International Application PCT/GB2019/053373, filed Nov. 28, 2019, which international application was published on Jun. 4, 2020, as International Publication WO 2020/109807 in the English language. The international application is incorporated herein by reference, in entirety. The international application claims priority to GB Patent Application No. 1819459.7, filed Nov. 29, 2018, which is incorporated herein by reference, in entirety.

TECHNICAL FIELD

The present disclosure relates to the field of redox flow battery technology. The disclosure relates more particularly, but not necessarily exclusively, to catholytes (positive electrolytes) for use in redox flow batteries.

BACKGROUND

Redox flow batteries (RFBs) are well known. They are electrochemical apparatus for power delivery and energy storage by means of a chemical redox reaction.

The chemical processes occurring in these systems can typically proceed in one direction in a power delivery mode (e.g. with a redox active species becoming reduced) and in the opposite direction during an energy storage mode (e.g. with the redox active species becoming oxidised).

In the power delivery mode, redox active species are supplied to electrodes where they react electrochemically to produce electrochemical power. RFBs can adjust their power output to meet fluctuating demand by altering the flow of electrolyte species for reaction. Because the redox active species can be stored separately from the electrode compartments and supplied when required, the generating capacity of this equipment is easily scalable.

Recent advancements in RFB systems have focused on vanadium-type systems. Such systems can be exemplified by the following redox chemical equation:

Equation 1

$$V^{IV}_{(sol)} + V^{III}_{(sol)} \rightleftharpoons V^{II}_{(sol)} + V^{V}_{(sol)}$$

However, there are limited worldwide reserves of vanadium and its availability can be volatile. This affects scalability and the uptake of RFB technology.

It is desirable to provide an RFB with an alternative electrolyte and/or to provide an alternative electrolyte and/or to provide an improved RFB and/or to obviate or mitigate issues with existing RFBs, whether identified herein or otherwise.

SUMMARY

According to the present disclosure, there is provided a redox flow battery comprising a gaseous anolyte and, as a catholyte, an organic redox active species having at least one electron directing moiety, wherein the organic redox active species is not unsubstituted parabenzoquinone.

There is also provided a catholyte for use in a redox flow battery, comprising an organic redox active species having at least one electron directing moiety as defined herein.

There is also provided a use of a catholyte in a redox flow battery, wherein the catholyte is an organic redox active species having at least one electron directing moiety as defined herein.

Definitions

In accordance with standard terminology in the field of redox flow batteries, the terms "anode" and "cathode" are defined by the functions of the electrodes in the power delivery mode. To avoid confusion, the same terms are maintained herein to denote the same electrodes whether in a power deliver mode of operation or an energy storage mode of operation.

The terms "anolyte" and "catholyte" are used to denote the electrolyte in contact with the "anode" and "cathode".

A "redox flow battery" comprises an electrochemical cell for the conversion of chemical energy into electricity. A redox flow battery comprises an anode compartment comprising an anode and an anolyte fluid (i.e. a gas or liquid) and a cathode compartment comprising a cathode and a catholyte fluid (i.e. a gas or liquid). A selective membrane is provided between the two compartments and is configured to exchange ions between the two compartments. In the present disclosure, the catholyte fluid is a liquid.

The compartments of electrolyte (catholyte and anolyte) fluid may be charged separately with two different "redox active species" that are each able to undergo reversible reduction-oxidation reactions. This allows the redox active species in one compartment to undergo, for example, an oxidation reaction while the redox active species in the other compartment undergoes a reduction reaction. The redox reactions cause a net flow of electrons between the compartments, thus generating an electrical current.

The term "alkyl" refers to a straight chain or branched, substituted or unsubstituted (e.g. unsubstituted) group containing from 1 to 40 carbon atoms (optionally from 1 to 20, such as from 1 to 10, such as from 1 to 5, optionally 2 carbon atoms). An alkyl group may optionally be substituted at any position.

The term "electron directing moiety" refers to a functional moiety that either donates ("electron donating group" or "electron releasing group") or withdraws ("electron withdrawing group") electron density from part of a molecule, increasing or reducing electronegativity. The electron-donating or electron-withdrawing properties of several hundred of the most common substituents, reflecting all common classes of substituents have been determined, quantified, and published. The most common quantification of electron-donating and electron-withdrawing properties is in terms of Hammett a values. Hydrogen has a Hammett a value of zero, while other substituents have Hammett a values that increase positively or negatively in direct relation to their electron-withdrawing or electron-donating characteristics. Substituents with negative Hammett a values are considered electron-donating, while those with positive Hammett a values are considered electron-withdrawing. See Lange's Handbook of Chemistry, 12th ed., McGraw Hill, 1979, Table 3-12, pp. 3-134 to 3-138, which lists Hammett a values for a large number of commonly encountered substituents.

The term "polymer" or "poly" when used to qualify a molecule refers to a molecule whose structure comprises multiple repeating units. The molecule may have 5, 6, 7, 8, 9, 10, or more repeat units. The molecule may have many repeat units, such as 100, 1,000, 10,000, or more. The term "copolymer" or "co-poly" when used to qualify a molecule refers to a molecule whose structure comprises at least two types of repeating units. The molecule may have 5, 6, 7, 8, 9, 10, or more repeat units of each type. The molecule may have many repeat units of each type, such as 100, 1,000, 10,000, or more.

The term "dendrimer" refers to a branched molecule comprising a core unit and having at least three constitutional repeating units pendant from the core unit (such as 5, 6, 7, 8, 9, 10, or more constitutional repeating repeat units). A dendrimer may have many repeat units, such as 100, 1,000, 10,000, or more. The "core unit" may comprise a polymeric skeleton (e.g. a polyethylene chain) from which constitutional repeating units depend. The core unit may comprise a non-polymeric central moiety from which constitutional repeating units depend (e.g. a benzene ring comprising 6 pendant constitutional repeating units). A "constitutional repeating unit" may be any suitable moiety, such as an optionally substituted aliphatic moiety, cyclic moiety, ester moiety, amide moiety, etc.

The term "dendron" refers to a part of a molecule comprising repetitive (at least three) terminal constitutional repeating units. A dendron has one free valence and is thereby able to join to a core unit. Each path from the free valence to any end-group may comprise the same number of repeating units. A dendron may form part (e.g. be the constitutional repeat unit) of a dendrimer.

The term "halogen atom", "halo" or "halogen", refers to a group 7 element of the Periodic Table of the Elements, such as, fluorine, chlorine, bromine and iodine, optionally fluorine or chlorine, optionally fluorine.

The term "carbocyclic compound" as used herein refer to a saturated or unsaturated cyclic aliphatic or aromatic monocyclic or polycyclic (including fused, bridging and spiro-fused) ring system which has from 3 to 20 carbon atoms. A carbocyclic compound may have from 3 to 15, such as from 3 to 12, such as from 3 to 10, such as from 3 to 8 carbon atoms, such as from 3 to 6 carbons atoms. Carbocyclic compounds groups may be substituted or unsubstituted, branched or unbranched.

A "heterocyclic compound" is a carbocyclic compound as described above, which additionally contains one or more heteroatoms. The heterocyclic compound may contain from 1 to 5 heteroatoms, such as from 1 to 4 heteroatoms, such as from 1 to 3 heteroatoms, such as 1 or 2 heteroatoms. Heterocyclic compounds may contain from 4 to 21 atoms, such as from 4 to 16 atoms, such as from 4 to 13 atoms, such as from 4 to 11 atoms, such as from 4 to 9 atoms, such as from 4 to 7 atoms, wherein at least one atom is a carbon atom. Suitable heteroatoms are selected from O, S, N, P and Si. When heterocyclic compounds have two or more heteroatoms, the heteroatoms may be the same or different. Heterocyclic compounds groups may be substituted or unsubstituted, branched or unbranched.

As used herein, the term "optionally substituted" means that one or more of the hydrogen atoms in the optionally substituted moiety is replaced by a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable compounds. The term "stable", as used herein, refers to compounds that are chemically feasible and can exist for long enough at room temperature (i.e. 16-25° C.) to allow for their detection, isolation and/or use in chemical synthesis.

Any of the above groups (for example, those referred to herein as "optionally substituted", including alkyl, aryl and heteroaryl groups) may optionally comprise one or more substituents, preferably selected from silyl, sulfo, sulfonyl, formyl, amino, imino, nitrilo, mercapto, cyano, nitro, halogen, —NCO, —NCS, —OCN, —SCN, —C(═O)$NR^0R^{00}$, —C(═O)$X^0$, —C(═O)$R^0$, —$NR^0R^{00}$, $C_{1-12}$alkyl, $C_{1-12}$ alkenyl, $C_{1-12}$ alkynyl, $C_{6-12}$ aryl, $C_{3-12}$cycloalkyl, heterocycloalkyl having 4 to 12 ring atoms, heteroaryl having 5 to 12 ring atoms, $C_{1-12}$ alkoxy, hydroxy, $C_{1-12}$ alkylcarbonyl, $C_{1-12}$ alkoxy-carbonyl, $C_{1-12}$ alkylcarbonyloxy or $C_{1-12}$ alkoxycarbonyloxy wherein one or more H atoms are optionally replaced by F or Cl and/or combinations thereof; wherein $X^0$ is halogen and $R^0$ and $R^{00}$ are, independently, H or optionally substituted $C_{1-12}$ alkyl. The optional substituents may comprise all chemically possible combinations in the same group and/or a plurality of the aforementioned groups (for example amino and sulfonyl if directly attached to each other represent a sulfamoyl radical).

The term "alkenyl" or "vinyl" refers to an unsubstituted or substituted alkyl group [comprising from 2 to 40 carbon atoms (optionally from 2 to 20, such as from 2 to 10, such as from 1 to 5, such as from 2 to 5, optionally 2 carbon atoms)] that comprises, in the straight or branched hydrocarbon chain, one or more carbon-carbon double bonds.

The term "alkynyl" refers to an unsubstituted or substituted alkyl group [comprising from 2 to 40 carbon atoms (optionally from 2 to 20, such as from 2 to 10, such as from 2 to 5, optionally 2 carbon atoms) that comprises a straight or branched hydrocarbon chain comprising one or more carbon-carbon triple bonds.

The term "carbonyl" refers to an unsubstituted or substituted —C(O)$R^A$ group, wherein $R^A$ is hydrogen, or an alkyl, alkenyl or alkynyl group.

The term "ester" refers to an unsubstituted or substituted —C(O)$OR^B$ (C-linked ester) or —$OCOR^B$ (O-linked ester) group, wherein RB is an alkyl, alkenyl or alkynyl group.

The term "amide" refers to an unsubstituted or substituted —C(O)$NR^C_2$ (C-linked amide) or —$NR^CCOR^D$ (N-linked amide) group, wherein each $R^C$ and/or $R^D$ are, independently, hydrogen, or an alkyl, alkenyl or alkynyl group.

The term "ether" refers to an unsubstituted or substituted —$OR^E$ group, wherein $R^E$ is or an alkyl, alkenyl or alkynyl group.

The term "amine" refers to an unsubstituted or substituted —$NR^F_2$ group, wherein $R^E$ is or an alkyl, alkenyl or alkynyl group.

The term 'alkyl', 'aryl', 'heteroaryl', etc. also include multivalent species, for example alkylene, arylene, 'heteroarylene' etc. Examples of alkylene groups include ethylene (—$CH_2$—$CH_2$—) and propylene (—$CH_2$—$CH_2$—$CH_2$—).

When an organic redox active species is described as comprising a depicted moiety, this means that the organic redox active species may be the depicted structure, or may be part of a larger molecule. The larger molecule may be selected from a carbocyclic compound, a heterocyclic compound (such as an oxazoline compound), a polymer (such as a copolymer and/or a branched polymer, optionally a hyper-branched polymer), a dendrimer, a dendron and a metallocene. Where the organic redox active species moiety is part of a larger molecule, points of attachment to the remainder of the larger molecule may take the place of one or more hydrogen atoms of the depicted moiety. By way of example, when the organic redox active species comprises the moiety:

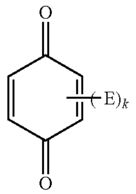

then a point of attachment to the remainder of the larger molecule may, for example, be as indicated at a position as indicated by the wavy bond in the structure below:

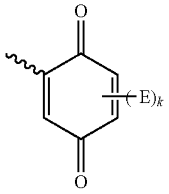

A point of attachment to the remainder of the larger molecule may, for example, be as indicated at a position as indicated by the wavy bond in a structure below:

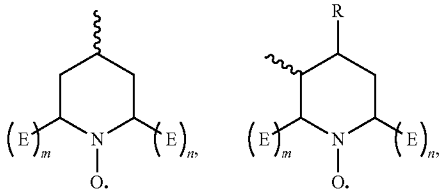

etc.

The organic redox active species may be attached to a polymer, such as a polymer having poly(acrylic acid) units. For example, the organic redox active species-polymer may be:

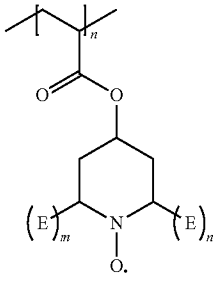

wherein n is an integer greater than 0.

The organic redox active species-polymer may be a copolymer, comprising first and second redox active moieties. The copolymer may comprise a first polymer having poly(acrylic acid) units attached to a first redox active moiety and a second polymer having poly(acrylic acid) units attached to a second redox active moiety. For example, the copolymer may be:

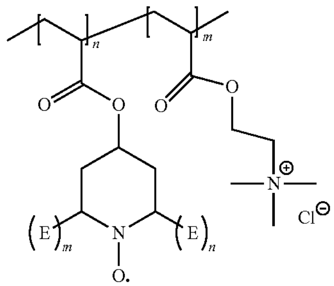

wherein n and m are each independently an integer greater than 0.

It will be appreciated that the moiety can be attached at multiple points, such as indicated at positions as indicated by the wavy bonds in the structure below:

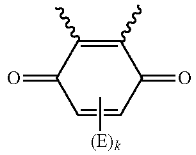

The organic redox active species may, for example, form part of a bicyclic, tricyclic or other multicyclic ring, such as indicated in the structures below:

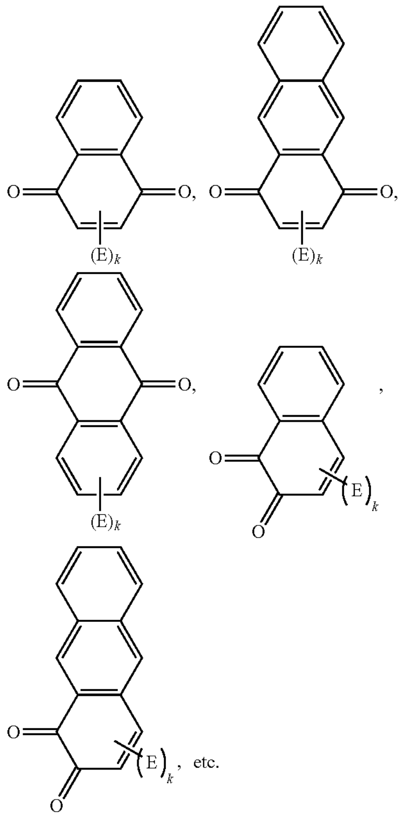

etc.

A "hyperbranched polymer" may be understood to be a three-dimensional "3D" polymeric network, where branching extends in multiple (e.g. substantially all) directions to form an interconnected network extending in multiple/all directions. A hyperbranched polymer may have a large number of branch points. A hyperbranched polymer differs from a dendrimer in that a hyperbranched polymer is not required to have constitutional repeating units. In other words, the branching in the hyperbranched polymer has a random (non-repeating) character.

DETAILED DESCRIPTION

According to the present disclosure, there is provided a redox flow battery comprising a gaseous anolyte and, as a catholyte, an organic redox active species having at least one electron directing moiety, wherein the organic redox active species is not unsubstituted parabenzoquinone.

The or each electron directing moiety may optionally not be oxo.

Use of a gaseous anolyte may be useful to ameliorate issues with electrolyte crossover, where anolyte and catholyte become intermixed (e.g. by permeating through a membrane between the anode and cathode compartment) and rendered inactive. Electrolyte crossover may otherwise lead to a gradual and irreversible decrease of battery performance. In the event that gaseous anolyte crosses over to the cathode compartment, it will be appreciated that separation of the gaseous anolyte from the catholyte can be achieved easily (e.g. simply by tapping off the gaseous anolyte, e.g. from an upper part of the cathode compartment). Similarly, in the event that liquid catholyte crosses over into the anode compartment, the liquid can simply be pumped out of the anode compartment (e.g. from a lower part of an anode compartment). The redox flow battery may be suitably configured to enable such tapping and/or pumping.

Furthermore, replacing liquid electrolyte storage tanks (which may be large depending on the implementation) with compressed gas storage vessels for hydrogen may reduce the amount of space taken up by the redox flow battery, further reducing costs.

The anolyte and/or catholyte may be stored externally to the anode/cathode compartments in one or more containers. The container may be a pressurised gas source vessel (e.g. for gaseous anolytes). The anolyte and/or catholyte may be supplied to the anode/cathode compartments by one or more conduits. The redox flow battery may comprise a pump configured to convey anolyte and/or catholyte (e.g. between a storage vessel and the cathode/anode compartment).

Organic redox active species are known for fast redox kinetics and scalable synthesis. In the context of energy storage at medium to large scale application, organic redox couples offer additional benefits associated with availability of raw materials (e.g. those which are not geographically restricted) and the strength of the supply chain of reagents. Thus, organic redox active species may present benefits over catholytes used in existing redox flow batteries, such as vanadium based redox systems.

Moreover, organic redox couples may represent a more environmentally-friendly alternative (e.g. having lower toxicity, lower reliance on non-renewable materials, better safety, etc.) to electrolytes for existing redox flow batteries, such as vanadium based redox systems.

The presence of at least one electron directing moiety may have a positive effect on the redox reactions taking place in the redox flow battery disclosed herein. Without wishing to be bound by theory, it is believed that the presence of at least one electron directing moiety on the organic redox active species of the present disclosure improves the ability of redox active species to undergo oxidation and/or reduction reactions by stabilising reactants, intermediates and/or products of such reactions.

By way of example, if a reaction involves a positively charged intermediate, an electron donating group may stabilise the intermediate and therefore facilitate reaction. It will be appreciated that the at least one electron directing moiety should direct electron density towards or away from regions of relatively low or high electron density (for electron donating and electron withdrawing groups respectively), to provide such a stabilising effect. By way of example, if a reaction involves a positively charged nitrogen centre, an electron donating group may direct electron density towards that positively charged nitrogen centre to provide a stabilising effect.

Thus, according to the present disclosure, the at least one electron directing moiety should provide a redox stabilising effect (i.e. stabilise the redox reaction taking place in the redox flow battery described herein).

An electron directing moiety may donate or withdraw electron density by resonance or inductive effects.

The present disclosure provides a redox flow battery that can be easily tailored to a specific implementation or application. The specific type of organic redox active species adopted, and/or its concentration in the redox flow batteries of the disclosure, can be tailored to meet desired operating parameters and/or tailored to be compatible with other components of the battery. By way of example, it may be desirable to utilise a catalyst at the anode (e.g. a platinum catalyst for batteries comprising a hydrogen half-reaction) and the present disclosure permits the selection of a specific organic redox active species which is compatible with such a catalyst. This offers flexibility with the redox flow batteries of the present disclosure.

It may also be desirable to tailor the energy densities of the batteries discussed herein and this may suitably be achieved by tailoring the concentration or nature/identity of the organic redox active species in the catholyte.

It may also be desirable to utilise an organic redox active species capable of two-electron redox reactions and organic redox active species discussed herein can be selected to this end.

The gaseous anolyte may be hydrogen. Therefore, the redox reaction which takes place at the anode may be:

$$2H^+ + 2e^- \rightleftharpoons H_2(gas)$$

The organic redox active species may comprise a plurality of electron directing moieties, such as 2, 3, 4 or more. In the event that the organic redox active species comprises more than one electron directing moiety, then the electron directing moieties may be the same as or different to one another.

The organic redox active species may be selected from a carbocyclic compound, a heterocyclic compound (such as an oxazoline compound), a polymer (optionally comprising poly(acrylic acid) units; optionally a copolymer; optionally a branched polymer; and/or optionally a hyper-branched polymer), a dendrimer, a dendron and a metallocene. The organic redox active species may be selected from a carbocyclic compound or a heterocyclic compound.

The organic redox active species may be a polymer selected from an optionally substituted polythiophene, polyaniline or polypyrrole.

The organic redox active species may comprise the optionally substituted moiety:

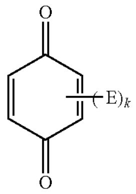
or
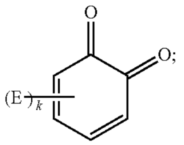

in which each E independently is an electron directing moiety; and k is 1, 2, 3 or 4 (optionally 2). As mentioned above, in the event there is more than one electron directing moiety (E), these may be the same as or different to one another. E can take any available position(s) on the ring of the organic redox active species (i.e. in place of one or more hydrogen atoms).

The organic redox active species may form part of a bicyclic, tricyclic or other multicyclic ring. The organic redox active species may comprise an optionally substituted quinone or anthraquinone moiety. The organic redox active species may comprise the optionally substituted moiety:

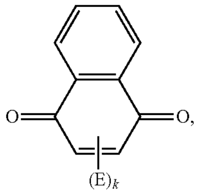
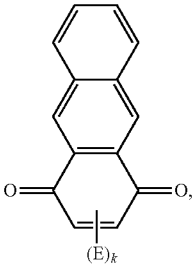
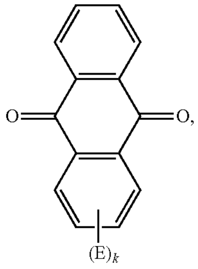
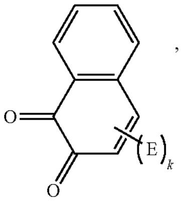
,
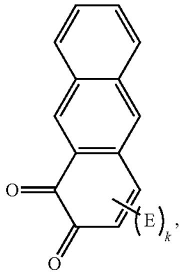
, etc.

It will be appreciated that one or more optional substituents, if present, can take the place of a hydrogen atom on the depicted ring structure and/or on one or more of said electron directing group(s) (E).

The organic redox active species may comprise the optionally substituted moiety:

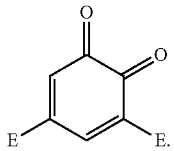

The organic redox active species may comprise the moiety:

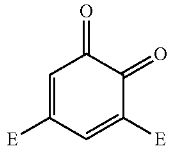

wherein each E is optionally substituted (optionally wherein one or both of said E is unsubstituted).

The organic redox active species may be optionally substituted:

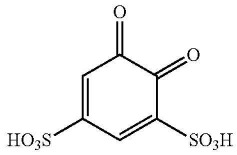
or
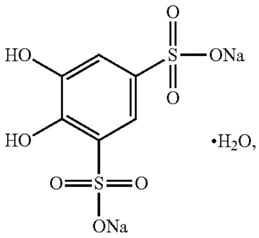
•$H_2O$, optionally

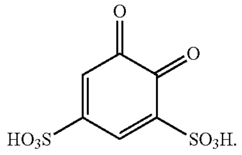

The organic redox active species may be:

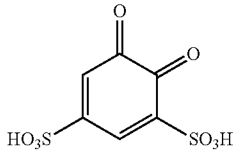
or
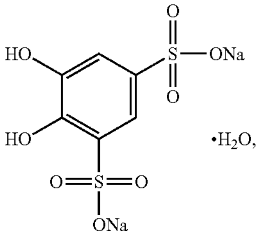
•$H_2O$, optionally

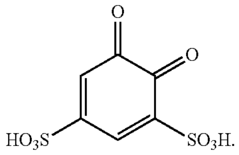

The organic redox active species may comprise the optionally substituted moiety:

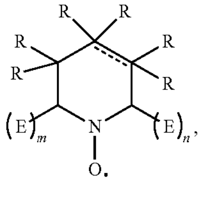

such as

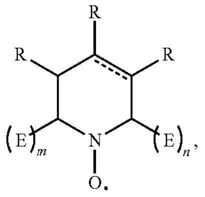
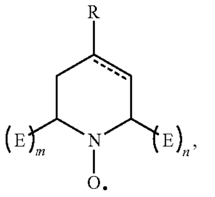
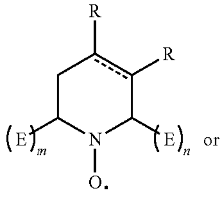
or
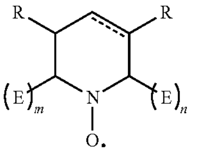

in which each R is independently selected from carboxylic acid (—COOH), —C(O)Oalkyl or hydrogen, optionally wherein each R is independently selected from carboxylic acid (—COOH), —$C(O)OCH_3$ or hydrogen;

each E independently is an electron directing moiety;

⋱ is either a double or single bond;

wherein n and m are independently 0, 1 or 2; and wherein n+m is at least 1 (optionally wherein n+m is 4).

It will be appreciated that one or more optional substituents, if present, can take the place of a hydrogen atom on the depicted ring structure and/or on one or more of said electron directing group(s) (E) and/or on said R group.

The organic redox active species comprise the moiety:

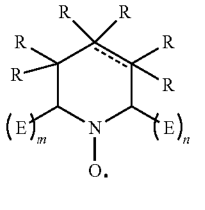

optionally

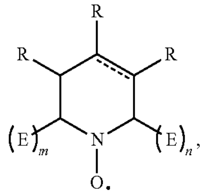

such as

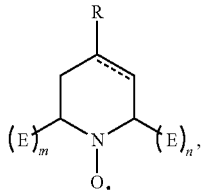
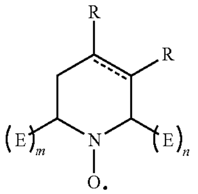
or
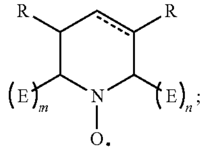

in which each R is independently selected from carboxylic acid (—COOH), —C(O)Oalkyl or hydrogen, optionally wherein each R is independently selected from carboxylic acid (—COOH), —$C(O)OCH_3$ or hydrogen;

each E independently is an electron directing moiety;

⋱ is either a double or single bond;

wherein n and m are independently 0, 1 or 2;

wherein n+m is at least (optionally wherein n+m is 4); and wherein E and/or R is optionally substituted (optionally wherein one or more of said E is unsubstituted and/or R is unsubstituted, optionally wherein one or more of said E is unsubstituted and R is unsubstituted, optionally wherein all of said E are unsubstituted and R is unsubstituted).

The or each electron directing moeity may be an electron withdrawing group. An electron withdrawing group may be selected from a sulfonyl (e.g. haloalkylsulfonyl, such as trifyl, —$SO_2CF_3$), haloalkyl (such as trihalomethyl, e.g. trifluromethyl), cyano, sulfonate, sulfonic acid, nitro, ammonium, carbonyl (e.g. formyl or acetyl), carboxylic acid, acyl halide (e.g. acetyl chloride or acetyl fluoride), C-linked ester, C-linked amide or a halide group. An electron withdrawing group may be a sulfonic acid or a sulfonate group, optionally a sulfonate.

A sulfonate may be understood to comprise the functional group —$SO_3^-$ and may be present together with any suitable counter ion, such as $Li^+$, $Na^+$, $K^+$, $Mg^{2+}$, $Ca^{2+}$, etc. The counter ion may be $Na^+$.

As indicated above, the or each electron directing moiety (e.g. the electron withdrawing group) may optionally not be oxo.

As indicated above, the or each electron withdrawing group may be optionally substituted.

The or each electron directing moeity may be an electron donating group. An electron donating group may be selected from a phenoxide, amine, ether, phenol, N-linked amide, 0-linked ester, alkyl, phenyl or a vinyl group. An electron donating group may be an optionally substituted alkyl group. An electron donating group may be an optionally substituted methyl or ethyl.

As indicated above, the or each electron donating group may be optionally substituted.

The catholyte may be aqueous.

The catholyte may have a pH between 0 and 14, depending on the nature of the organic species. The catholyte may be buffered.

The catholyte may comprise an acid, such as sulfuric acid. The catholyte may have a pH of at most about 6, optionally at most about 5, optionally at most about 4, optionally at most about 3, optionally at most about 2, optionally at most about 1, optionally at most about 0. The catholyte may have a pH of at least about 0, optionally at least about 0.5, optionally at least about 1, optionally at least about 1.5, optionally at least about 2, optionally at least about 2.5.

In the event the organic redox active species is sulfonated (e.g. if the organic redox active species is

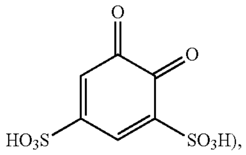

the catholyte may be strongly acidic, having a pH of at most about 2, optionally at most about 1, optionally at most about 0.

The organic redox active species may be optionally substituted:

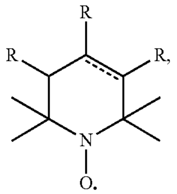

such as

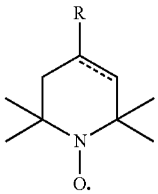 , 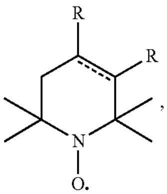 ,

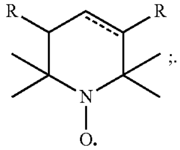 ;

in which each R is independently selected from carboxylic acid (—COOH), —C(O)Oalkyl or hydrogen, optionally wherein each R is independently selected from carboxylic acid (—COOH), —$C(O)OCH_3$ or hydrogen and  is either a double or single bond. The organic redox active species may be optionally substituted:

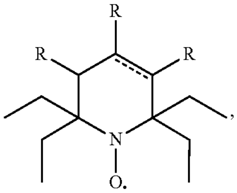

such as

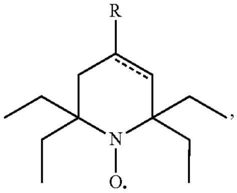 , 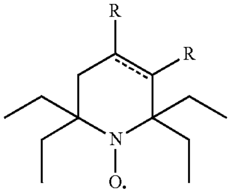 or

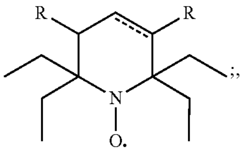 ;

in which each R is independently selected from optionally substituted carboxylic acid (—COOH), —C(O)Oalkyl or hydrogen, optionally wherein each R is independently selected from carboxylic acid (—COOH), —$C(O)OCH_3$ or hydrogen; and  is either a double or single bond. In the event that R is not hydrogen, R may be unsubstituted.

The organic redox active species may be:

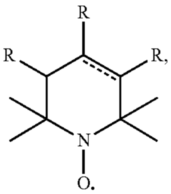

such as

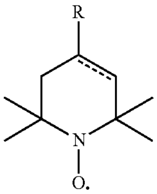 , 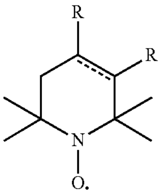 or

-continued

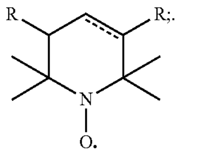

in which each R is independently selected from optionally substituted carboxylic acid (—COOH), —C(O)Oalkyl or hydrogen, optionally wherein each R is independently selected from carboxylic acid (—COOH), —C(O)$OCH_3$ or hydrogen. In the event that R is not hydrogen, R may be unsubstituted.

The organic redox active species may be:

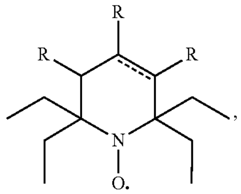

such as

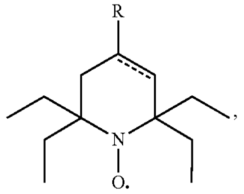

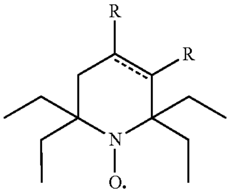

or

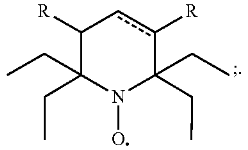

in which each R is independently selected from optionally substituted carboxylic acid (—COOH), —C(O)Oalkyl or hydrogen, optionally wherein each R is independently selected from carboxylic acid (—COOH), —C(O)$OCH_3$ or hydrogen; and  is either a double or single bond. In the event that R is not hydrogen, R may be unsubstituted.

The catholyte may comprise an alkali. The catholyte may have a pH of at least about 7, optionally at least about 8, optionally at least about 9, optionally at least about 10, optionally at least about 11, optionally about 11. The catholyte may have a pH of at most about 14, optionally at most about 13, optionally at most about 12, optionally at most about 11.

The concentration of the organic redox active species in the may catholyte determine the power and energy density of the redox flow battery. Therefore, the concentration of organic redox active species in the catholyte may be at least about 0.2 M, such as greater than about 0.5 M, e.g. greater than about 1 M, such as about 1.0 M. The concentration of organic redox active species in the catholyte may be at most about 3 M, such at most about 2.5 M, e.g. at most about 2 M, such as at most about 1.5 M.

The redox flow battery may comprise an ion exchange membrane. The ion exchange membrane may be an anion exchange membrane or a cation exchange membrane. The ion exchange membrane may be permeable to hydrogen ions and solvated hydrogen ions, optionally ion exchange membrane may be a proton exchange membrane. Proton exchange membranes are well known in the art, for example, the Nafion™ ion exchange membrane produced by DuPont.

The membrane may be a porous separator, such as a microporous membrane. Alternatively, the membrane may be a hybrid of both cation and anion conductors.

The redox flow battery may comprise a graphitic anode and/or cathode. The anode may be a porous electrode (such as a porous gas electrode). The cathode may be a porous or non-porous electrode (optionally a porous electrode). Examples of suitable electrodes are well known in the art.

A porous carbon electrode may be a catalysed porous carbon electrode. Examples of catalysed porous carbon electrodes include catalysed carbon paper, cloth, felt and composites. The cathode may comprise one or more catalysed carbon papers. The carbon may be graphitic, amorphous, or have a glassy structure.

Examples of other suitable electrodes include corrosion resistant metals (or metal alloys), such as titanium or alloys thereof, in form of meshes felts or foams.

The anode of the redox flow battery may comprise platinum, palladium, iridium, ruthenium, rhenium, rhodium, osmium or combinations thereof, including alloys for example a platinum/ruthenium alloy or binary catalyst such as PtCo, PtNi, PtMo etc. or ternary catalyst PtRuMo, PtRuSn, PtRuW etc. or chalcogenides/oxides as RuSe, PtMoOx etc. The anode may comprise platinum. The anode may be a catalysed electrode and the cathode may be a non-catalysed electrode.

The redox flow battery may be a reversible flow battery configured to operate in a power delivery mode in which it generates electrical power by the reaction of redox active species and in an energy storage mode in which it consumes electrical power to generate said redox active species.

In a power delivery mode, a redox active species is oxidised at the anode and a redox active species is reduced at the cathode to form reacted (or "spent") redox active species. In the energy storage mode, electrochemical system is reversed and the "spent" catholyte species is electrochemically oxidised at the cathode to regenerate the corresponding redox active species.

Reversible redox flow batteries can generally be distinguished from fuel cells by their "plumbing". A reversible redox flow battery has conduits both for supplying redox active species to the electrodes for the power delivery phase, and also for conducting the spent redox active species to a store, such as one or more storage vessels (e.g. one for spent anolyte and another for spent catholyte) so that it can be regenerated. Often the redox active species will be in the form of electrolyte that is exhausted following a power delivery phase and, in this case, conduits may be arranged to conduct exhausted (or spent) electrolyte to a store and supply it back to its half-cell during an energy storage mode, e.g. by the use of appropriate pumps.

In contrast, fuel cells are not set up to operate in energy storage mode to electrochemically replenish exhausted electrolyte. In the case of redox flow batteries having a half-cell containing a gas electrode, a compressor is generally provided to compress gas generated during the energy storage mode to enable it to be collected in a compressed gas storage tank for future power delivery phases. In contrast a fuel cell will generally not have such a compressor.

The redox flow battery may include one or more vessels configured to contain the liquid catholyte and/or anolyte containing the cathodic redox active species, which first vessel is connectable, in the power delivery mode, to the catholyte compartment for delivering liquid catholyte/anolyte containing the redox active species to the cathode and/or anode compartment. The one or more vessels may be connectable, in the energy storage mode, to the cathode and/or anode compartment for receiving catholyte containing generated redox active species from the cathode and/or anode compartment.

The redox flow battery may include one or more vessels configured to contain the liquid catholyte and/or anolyte containing spent redox active species, which one or more vessels are connectable, in the power delivery mode, to one or more conduits for receiving the catholyte containing spent redox active species from the cathode and/or anode compartment. Said one or more vessels may be connectable, in the energy storage mode, to a conduit for supplying the catholyte containing spent redox active species to the catholyte compartment.

The redox flow battery may include a pressurised gas source vessel (e.g. configured to contain hydrogen), which gas source is connectable, in the power delivery mode, to the anode. The pressurised gas source vessel may be connectable, in the energy storage mode, to the anode to receive gas (e.g. hydrogen) generated in the energy storage mode.

The redox flow battery may include at least one compressor configured to pressurise gas generated at the anode in the energy storage mode for storage in the pressurised gas source vessel, and optionally also a gas expander-generator to deliver electricity as a result of expansion of the compressed gas.

The battery can operate without a compressor, provided the gas storage tank is sufficiently large to accommodate the generated gas. The redox flow battery may comprise a means for circulating the hydrogen gas through the conduits between the storage vessel and the anode compartment, e.g. a pump or a fan. The redox flow battery may also additionally include a dryer which dries the hydrogen gas before it is stored in the source vessel. The redox flow battery may also be equipped with a hydrogen expander-generator to deliver electricity as a result of compressed gas expansion.

It will be appreciated that the redox reactions involving hydrogen will not produce any "spent" species at the gas anode in the power delivery mode as the redox active hydrogen species is transformed into protons that are dissolved in the electrolyte. Protons are selectively passed by the membrane separating the anode and cathode compartments from the anode side of the membrane to the cathode side of the membrane. The electrons produced during the oxidation of the hydrogen gas at the anode during the power delivery mode are collected by a current collector. However, any unreacted hydrogen gas may be transferred away from the anode compartment by one or more conduits and returned to a gas source vessel (which may be pressurised or unpressurised). In the energy storage mode, protons are selectively passed by the membrane separating the anode and cathode compartments from the cathode side of the membrane to the anode side of the membrane and protons are reduced at the anode to regenerate the hydrogen gas, which forms the anode redox active species.

There is also provided a catholyte for use in a redox flow battery, comprising an organic redox active species having at least one electron directing moiety as defined herein. Features of the catholyte described above in relation to the redox flow battery apply equally to the catholyte for use in a redox flow battery, mutatis mutandis.

There is also provided a use of a catholyte in a redox flow battery, wherein the catholyte is an organic redox active species having at least one electron directing moiety as defined herein. Features of the catholyte described above in relation to the redox flow battery apply equally to the use of a catholyte in a redox flow battery, mutatis mutandis.

FIGURES AND EXAMPLES

Figure 1:
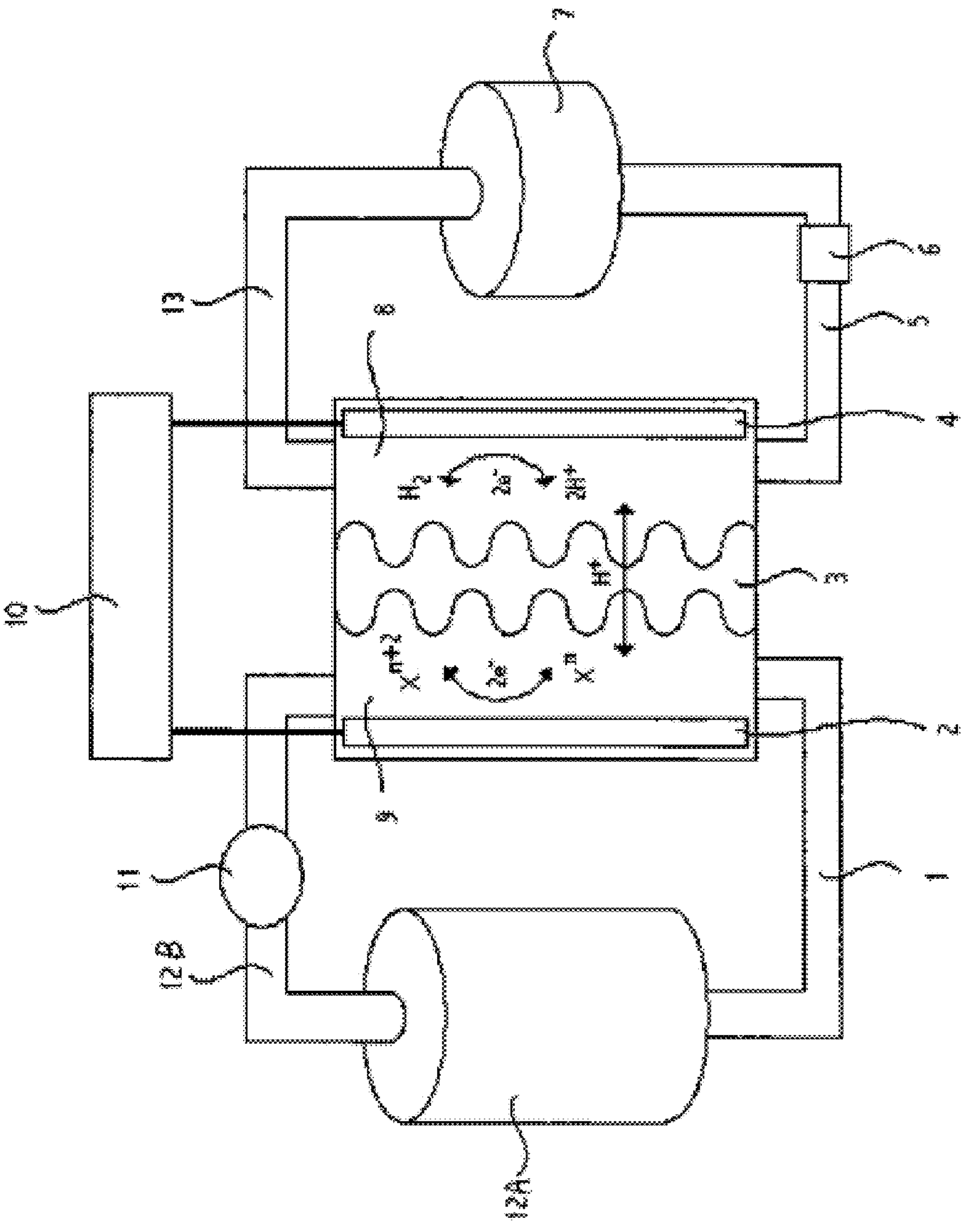
FIG. 1 is a schematic sectional view of a liquid/gas redox flow battery of the disclosure (the terms "liquid" and "gas" denoting the phases of the organic redox active species supplied to the cathode and anode respectively).

FIG. 1 shows a schematic of a redox flow battery in which the organic redox active species used to generate power are (a) hydrogen gas (supplied to the anode) and (b) an organic redox active species (supplied to the cathode).

In the power delivery mode, the liquid catholyte containing the organic redox active species (denoted herein as "$X^{n+2}$") is pumped by a pump (11) from a compartment of fresh catholyte storage container (12A), through a conduit (12B) and into the catholyte compartment (9), where it is reduced at a cathode (2) according to the half reaction:

$$X^{n+2} + 2e^{-} \longrightarrow X^{n}$$

The catholyte containing the spent electrolyte species $X^n$ is then carried away from the catholyte compartment through a second conduit (1) to the catholyte storage container (12A), where it is stored in a compartment separate from the fresh catholyte compartment.

The anode and at least part of the anolyte compartment (8) are formed by a porous gas flow electrode (4) and hydrogen is supplied from a pressurised gas source vessel (7) through a conduit (13), to the anode/anode compartment (8), where the hydrogen is oxidised to protons ($H^+$) according to the half reaction:

$$H_2 \longrightarrow 2H^+ + 2e^-$$

and the current is collected by a current collector (also labelled 4). A proton exchange membrane (3) separates the anolyte and catholyte compartments (8 & 9) and selectively passes the protons from the anolyte to the catholyte side of the membrane (3) to balance the charge, thereby completing the electrical circuit. Any unreacted hydrogen is carried away from the anolyte compartment (8) by a second conduit (5) and returned to the pressurised gas source vessel (7) via compressor (6).

In the energy storage mode, the system is reversed so that the redox active species $X^n$ is pumped from the catholyte storage container (12A), through the conduit (1) to the catholyte compartment (9), where the spent electrolyte species $X^n$ is oxidised at the cathode (2) to form the redox active species $X^{n+2}$. The resulting regenerated electrolyte is transferred away from the catholyte container (9) by the pump (11), through the second conduit (12B) to the catholyte storage container (12A). Meanwhile, protons at the anolyte side of the proton exchange membrane (3) are catalytically reduced at the porous gas anode (4) to hydrogen gas; the hydrogen is transferred away from the porous anode (4) through the conduit (5) and compressed by the compressor (6) before being stored in the pressurised gas source vessel (7).

It will be appreciated that the above system is illustrated with an redox active species that undergoes a two-electron reduction $$(X^{n+2} + 2e^- \longrightarrow X^n).$$

However, the redox active species could be one which undergoes a single-electron reduction).

1.1 General Procedure

The fuel cell fixture was purchased from Scribner Associates. The cell included two POCO graphite bipolar plates with a machined serpentine flow field in contact with gold-plated copper current collectors that are held together utilizing anodized aluminum end plates. Electrode dimension was 5 $cm^2$. Commercially available 4.6 mm thick plasma activated graphite felt (SGL group, Germany, Sigracet) was used as the positive electrode. The Hydrogen negative electrode was obtained from Johnson Matthey-Alfa Aesar (0.22 mm thickness and 0.4 mg Pt $cm^{-2}$ loading). The membrane was Nafion® 117 (nominal thickness 183 μm). A peristaltic pump (Masterflex easy-load, Cole-Palmer) and Masterflex platinum-cured silicone tubing (L/S 14, 25 ft) were used to pump the liquid electrolyte through the cell at flow rate of 5-120 mL $min^{-1}$. Hydrogen was provided by a fuel cell test station (850e, Scribner Associates), passing through the negative side at a flow rate of 25-100 mL $min^{-1}$. Galvanostatic charge and charge experiments were conducted with a Gamry potentiostat 3000.

1.2 Preparation of Organic Redox Active Species Solution

Catholyte solutions were prepared with 0.65 M of the following organic redox active species:

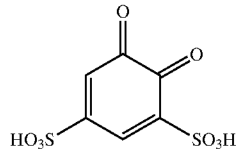 [SMILES: O=C1C=C(S(=O)(=O)O)C=C(S(=O)(=O)O)C1=O]

(hereinafter referred to as "BO") by dissolving corresponding amounts of BQ (Sigma-Aldrich) in 1 M concentrated sulphuric acid. A Masterflex easy-load peristaltic pump and Masterflex Chem-Durance tubing were used to pump the catholyte through the cell. This solution was used for all experiments, except where indicated otherwise.

1.3 Charge and Discharge Cycle

Standard Cycle

The following procedure details the standard steps taken when performing a charge/discharge cycle. The organic redox active species and hydrogen flow rates remained constant throughout the procedure.

1. The system was discharged to a target voltage of 0.1V using the current density at which the cycle was to be performed. If the system's state of charge (SOC) was below this target, the system was charged to a point above the target SOC and then discharged to 0 V.
2. The open circuit voltage (OCV) of the system was measured for 5 minutes.
3. The system was charged at the desired current density until the upper voltage cut-off limit of 1.1V was reached.
4. The OCV of the system was measured for 5 minutes.
5. The system was discharged at the desired current density until the lower voltage cut-off limit was reached.
6. The OCV of the system was measured for 5 minutes.

Cycle Between Set Capacities

1. The system was discharged to a target voltage of 0 V using the current density at which the cycle was to be performed. If the system's SOC was below this target the system was charged to a point above the target SOC and then discharged to 0 V.
2. The time t (in seconds) required to reach the desired capacity for a particular current is calculates using equation 1.1.

$$t = \frac{n \cdot F \cdot C \cdot V}{I} = \frac{Q}{3.6 \cdot It}[s] - 3.6 * \frac{\text{Capacity [mAh]}}{\text{Current [A]}} \quad (1.1)$$

$$t[s] = \frac{\text{Capacity[mAh]}3,\ 600\left[\frac{s}{hr}\right] \times 10^3\left[\frac{A}{mA}\right]}{i[A]}$$

Where n—number of electrons, F— Faraday number, C— species concentration [mole/L], V— total solution volume [L], I— current [A], Q—capacity [mAh]

3. The OCV of the system was measured for 5 minutes.
4. The system was charged at the desired current density for the time calculated in step 2 or until the upper voltage cut-off limit was reached.

5. The OCV of the system was measured for 5 minutes.
6. The system was discharged at the desired current density for the time calculated in step 2 or until the lower voltage cut-off limit was reached.
7. The OCV of the system was measured for 5 minutes.

1.4 System Testing

Example 1: Cyclic Voltammogram for 1 mM BQ in 1 M $H_2SO_4$

Figure 2:
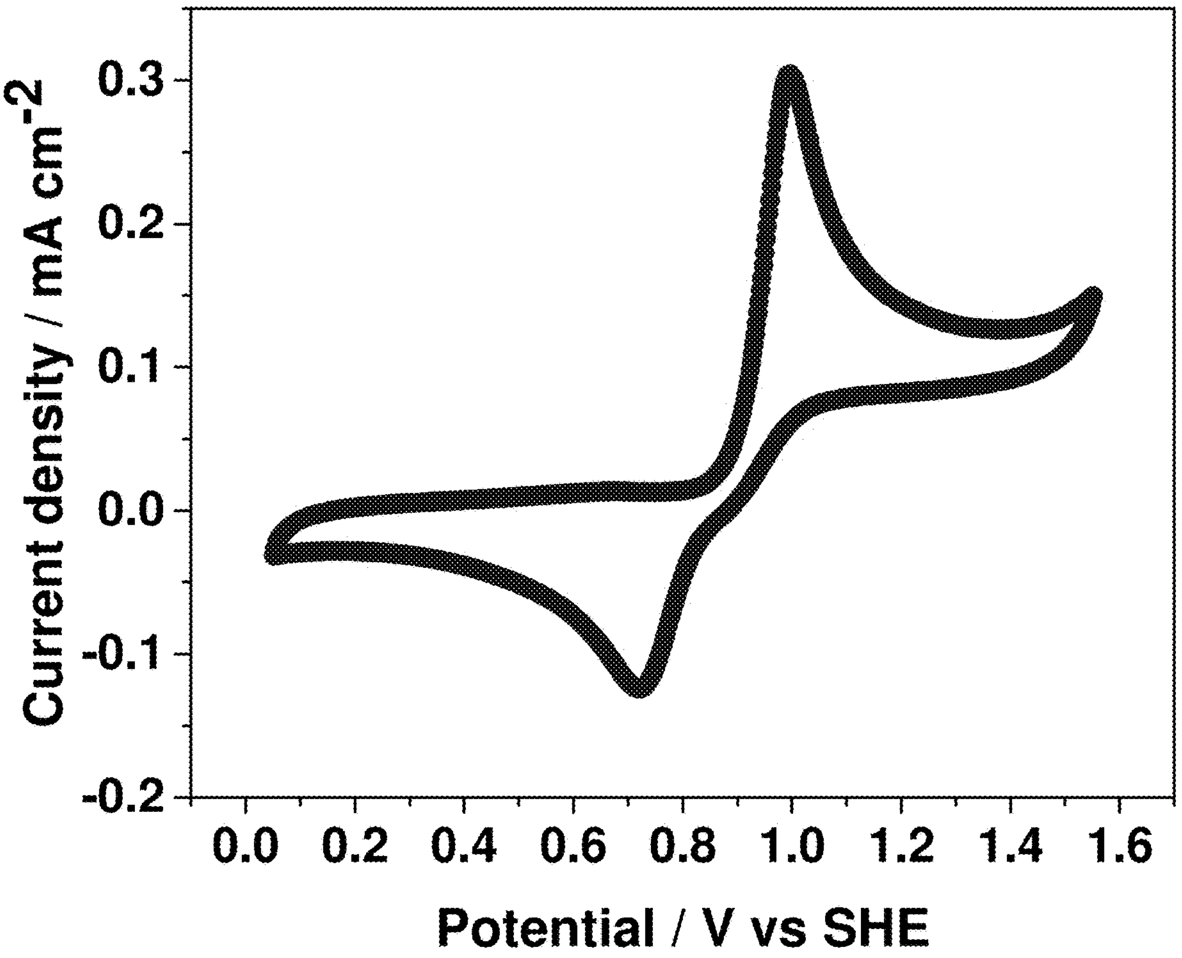
FIG. 2 shows a cyclic voltammogram of an organic redox active species.

FIG. 2 shows a cyclic voltammogram of 1 mM quinone in 1 M sulphuric acid with a scan rate of 50 mV $s^{-1}$ between −0.6 V and +0.9 V versus a mercury/mercuric sulfate (MSE) reference potential (E0=+0.65 V). The working electrode was a glassy carbon electrode and the counter electrode was a platinum wire.

As can be seen, an oxidation peak occurs at 1 V vs MSE and a reduction peak occurs at 0.7 V vs MSE, and oxidation is much faster than reduction.

Figure 3:
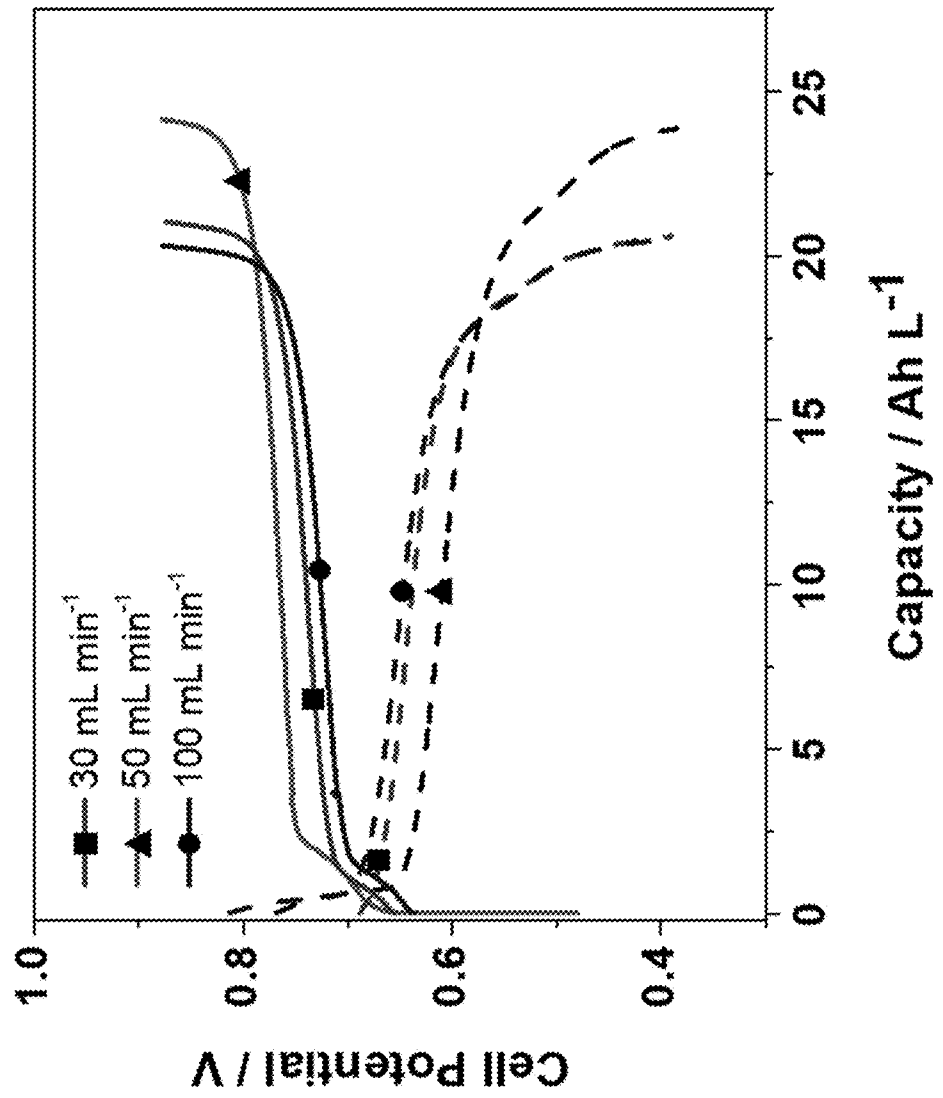
FIG. 3 shows charge/discharge curves for an organic redox active species/hydrogen redox flow battery, using 0.65M organic redox active species, at variable flow rates

Example 2: Charge/Discharge Cycle for 0.65M BQ in 1 M $H_2SO_4$ at Different Flow Rates System parameters that affect the utilisation of redox species are current density, voltage window and electrolyte flow rate. It has been observed that as the current density increases, utilisation of electrolyte decreases. Current density also determines the operating power of the system. There is a trade-off between electrolyte utilisation and power output. The effect of BQ flow rate on capacity utilisation was studied at a current density of 60 mA/cm2 (FIG. 3). The hydrogen flowrate was maintained at 100 mL/min throughout each cycle. Charging is shown in the upper data series and discharging in the lower data series.

At a BQ flow rate of 50 mL/min, the system had a capacity utilisation of 68% (see Table 1).

Decreasing the flow rate to 30 mL/min resulted in a decrease in capacity utilisation to 58%. This shows the importance of mass transport and concentration polarisation losses to the system. Increasing the flow rate to 100 mL/min had a negative effect, resulting in a capacity utilisation to 56%.

TABLE 1

Capacity utilisation for a wide range of BQ flow rates

| Cycle Number [—] | Capacity Utilisation [%] |
|---|---|
| 1 - 30 mL/min | 58% |
| 2 - 50 mL/min | 68% |
| 3 - 100 mL/min | 56% |

Figure 4:
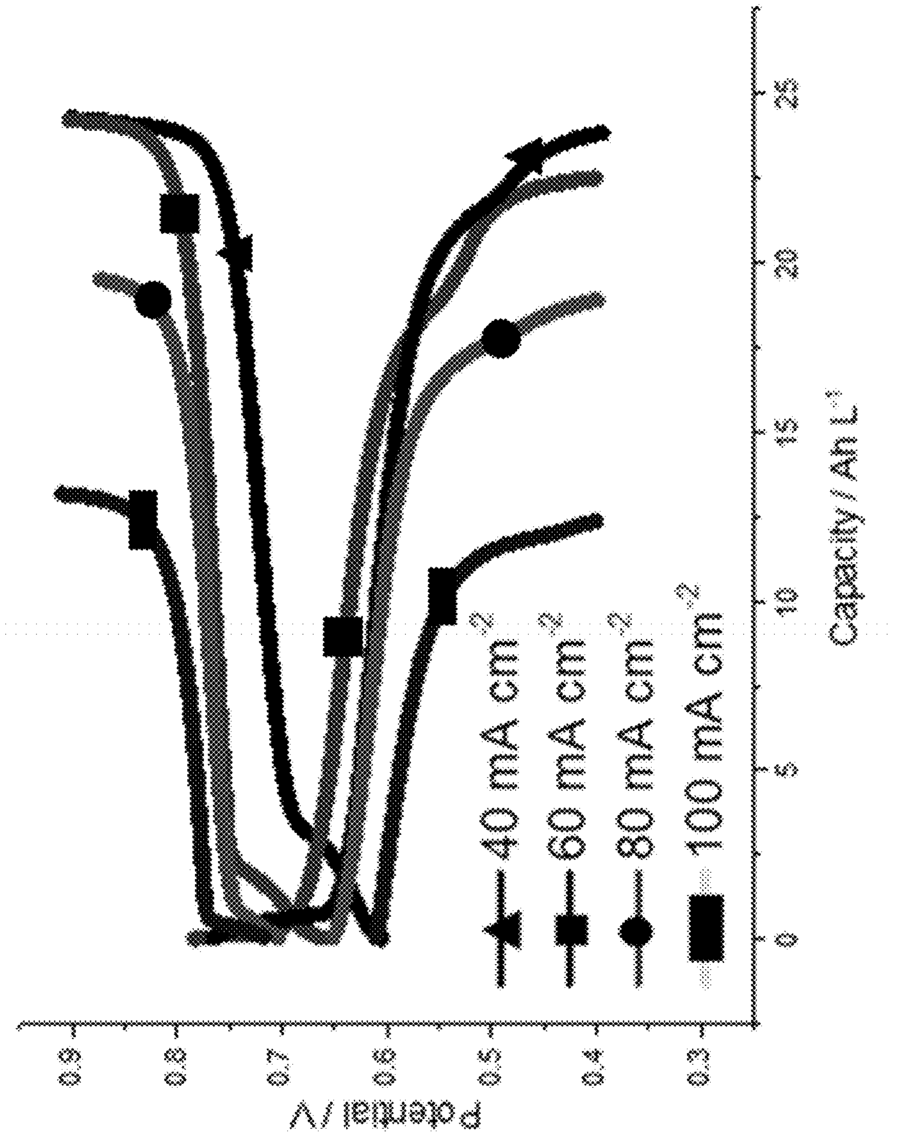
FIG. 4 shows charge/discharge curves for an organic redox active species/hydrogen redox flow battery, using 0.65M organic redox active species, at variable currently densities.

Example 3: Charge/Discharge Cycle for 0.65M BQ in 1 M $H_2SO_4$ at Different Current Densities The system was charged to a target capacity of 25 Ah, representing a 72% utilisation of the maximum theoretical capacity of 34.8 Ah. The hydrogen flowrate was maintained at 100 mL/min throughout each cycle. The effect of current density (40 mA/$cm^2$, 60 mA/$cm^2$, 80 mA/$cm^2$, 100 mA/$cm^2$) on capacity utilisation was studied at a BQ flow rate of 50 mL $min^{-1}$ (FIG. 4).

From the results it was observed that the overpotential for both charge and discharge steps increased as the current density increased. Overpotentials are due to losses associated with ohmic resistance, charge transfer and mass transport phenomena. At the start of each charge/discharge step the losses are most likely predominated by charge transfer processes while at the end it is mostly mass transport limitations that contribute to the overpotential.

Figure 5:
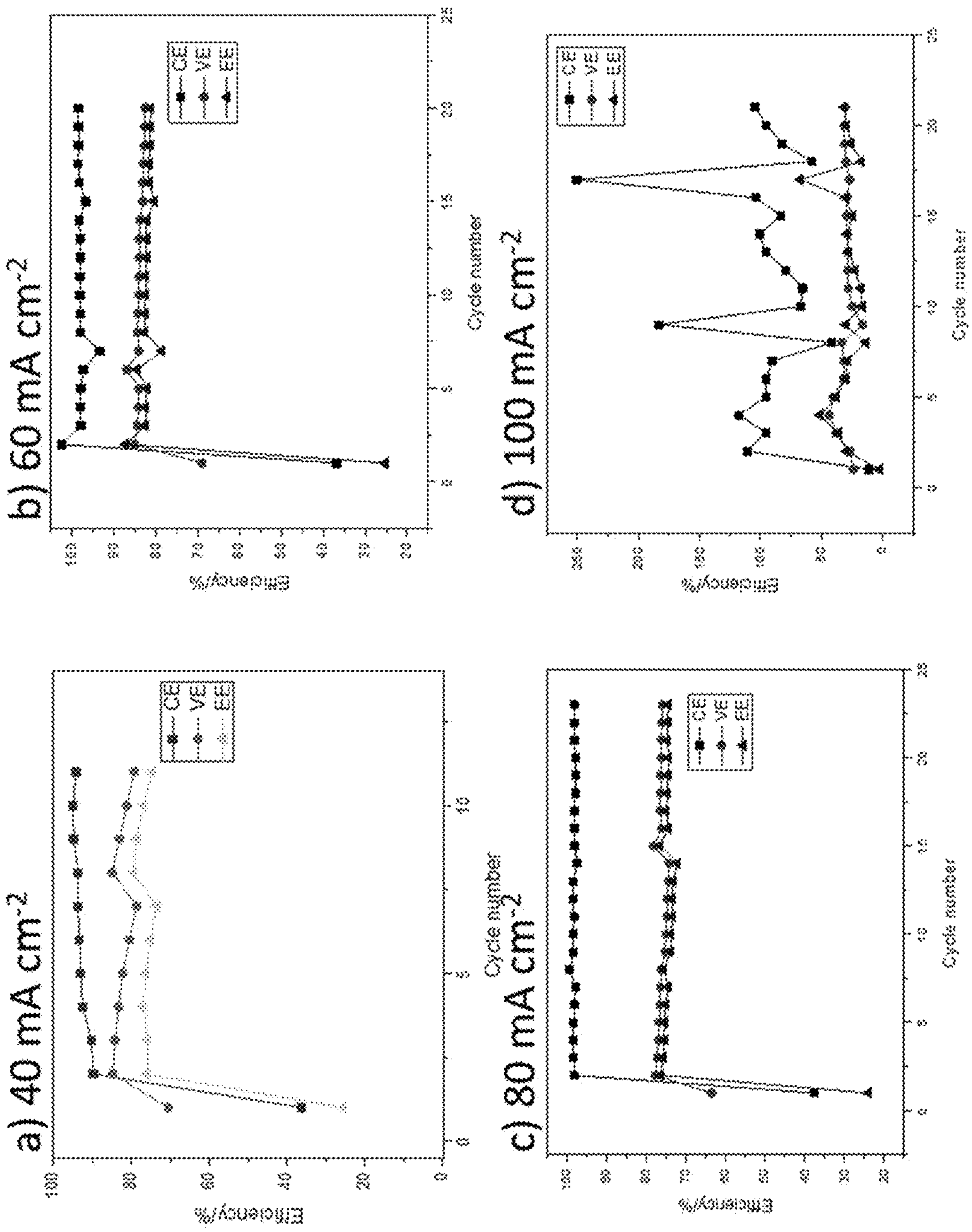
FIG. 5 shows charge efficiency (CE), voltage efficiency (VE) and energy efficiency (EE) over a number of cycles for an organic redox active species/hydrogen redox flow battery, using 0.65M organic redox active species, at variable currently densities.

Example 4: Cyclability/Longevity Studies for 0.65 M BQ in 1 M $H_2SO_4$ at a Flow Rate of 50 ml/min FIG. 5 shows the results of initial cyclability/longevity studies. Specifically, FIG. 5 shows the charge efficiency (CE), voltage efficiency (VE) and energy efficiency (EE) over a number of cycles for a BQ redox flow battery. CE is defined as the discharge capacity divided by the charge capacity. VE is defined as the middle point of the discharge voltage divided by the middle point of the charge voltage. Energy efficiency is defined as the product of CE and VE.

The BQ concentration was 0.65 M in 1 M sulphuric acid. The liquid flow rate was 50 mL $min^{-1}$ and the gas flow rate was 100 mL $min^{-1}$.

FIG. 5*a*), b), c) and d) show CE, VE and EE at four different current densities: 40 mA $cm^{-2}$, 60 mA $cm^{-2}$, 80 mA $cm^{-2}$, and 100 mA $cm^{-2}$, respectively. As can be seen, the highest EE is achieved at 60 mA $cm^{-2}$, which shows excellent performance over at least 20 cycles. Over 200 full cycles have been collected at 60 mA $cm^{-2}$. Current densities of 40 mA $cm^{-2}$ and 80 mA $cm^{-2}$ also exhibit good performance. At a current density of 100 mA $cm^{-2}$, efficiency is significantly reduced, possibly due to the onset of side reactions.

Figure 6:
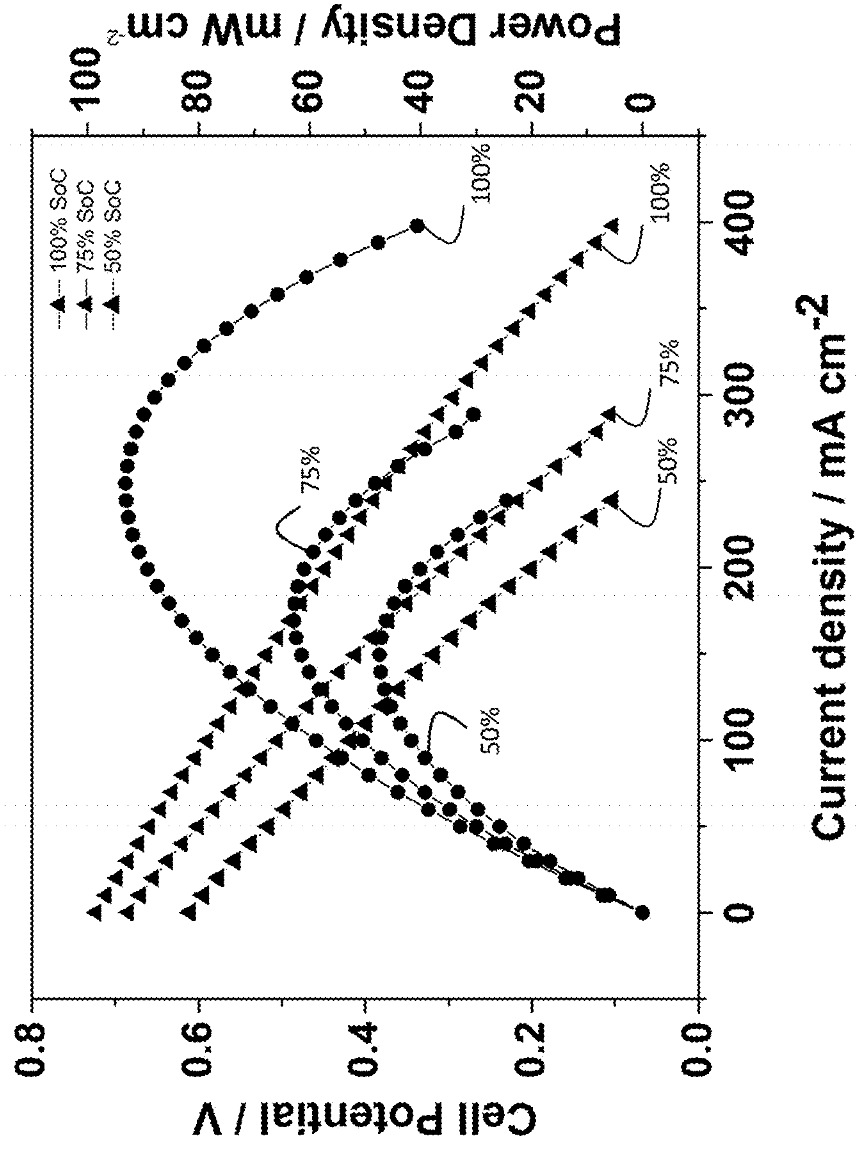
FIG. 6 shows power density curves at varying states of charge for an organic redox active species/hydrogen redox flow battery, using 0.65M organic redox active species at a flow rate of 50 ml/min.

Example 5: Power Density for 0.65 M BQ in 1 M $H_2SO_4$ at a Flow Rate of 50 ml/Min Power curves were measured for the system at a BQ flow rate of 50 mL/min and at three states of charge (SOC) (FIG. 6). The hydrogen flowrate was maintained at 100 mL/min throughout.

Example 6: Rotating Disk Electrode Measurements

Figure 7:
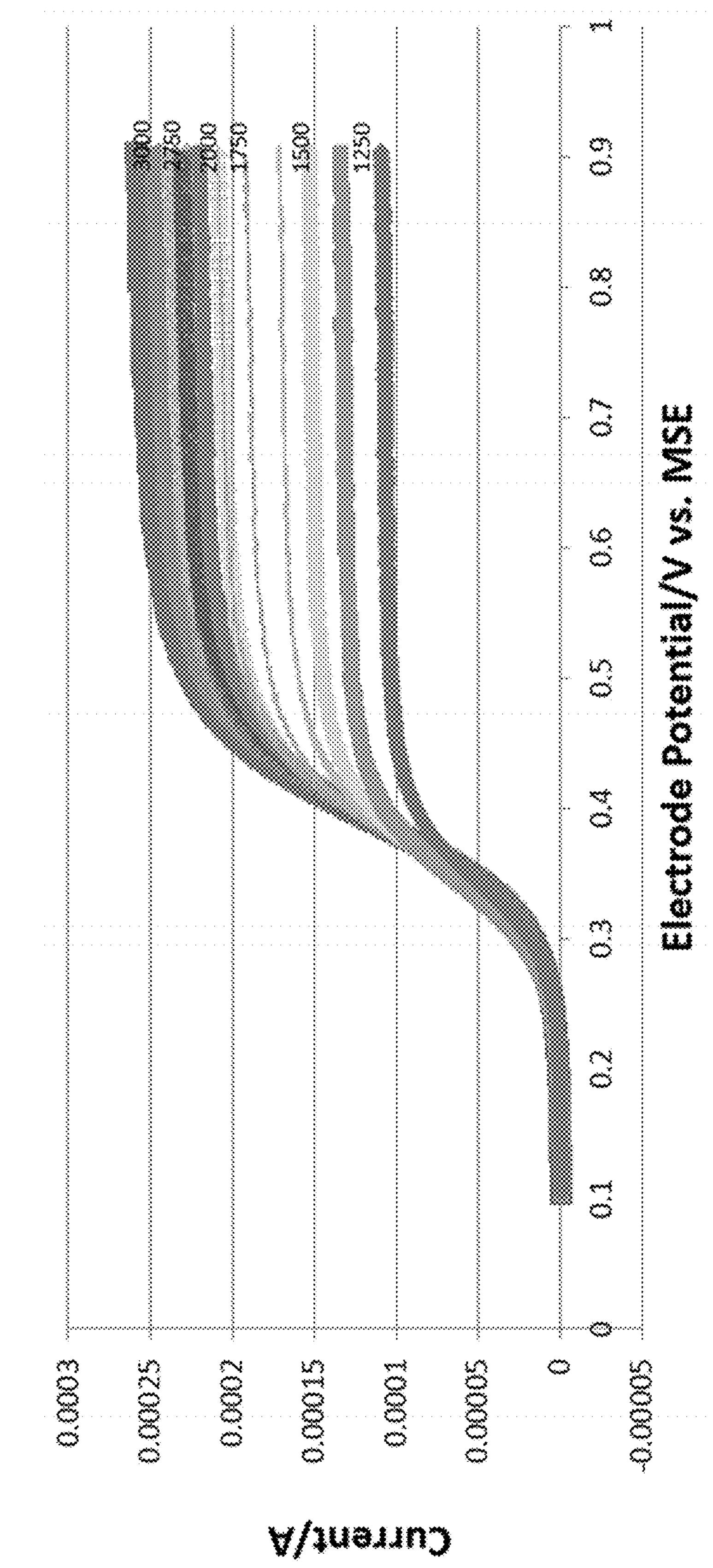
FIG. 7 shows plots of current versus potential of an organic redox active species at different rotation rates (rpm) of a rotating disk electrode.

FIG. 7 shows plots of current versus potential of hydroquinone oxidation at different rotation rates (1250 rpm for the lowermost plot, increasing through 1500, 1750, 2000, 2250, 2500, 2750, with 3000 being the uppermost plot) of a rotating disk electrode with an area of 0.1925 $cm^2$. The hydroquinone concentration was 1 mM and the kinematic viscosity of the solution was 0.01 $cm^2$ $s^{-1}$. Using the Levich equation, the diffusion coefficient of benzoquinone was calculated to be $1.5707\times10^{-7}$ $cm^2$ $s^{-1}$.

Figure 8:
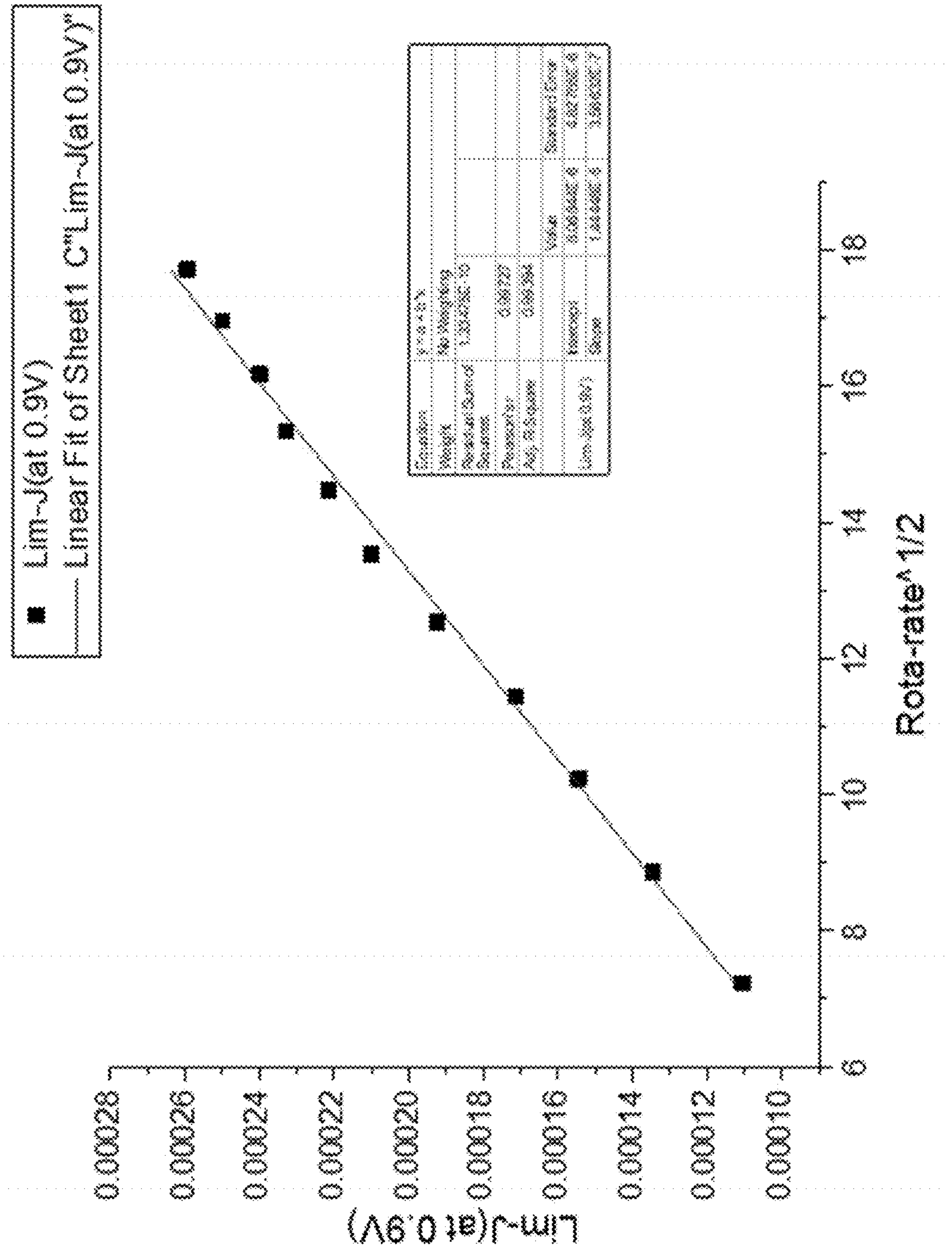
FIG. 8 shows a plot of the limiting current at 0.9 V vs MSE against the square root of the electrode rotation rate, based on the data shown in FIG. 7.

FIG. 8 shows a plot of the limiting current at 0.9 V vs MSE against the square root of the electrode rotation rate, based on the data shown in FIG. 7.

2.1 General Procedure

A further series of experiments were conducted. The same fuel cell fixture as described in section "1.1 General procedure" above was used, except that the Nafion membrane was activated via the following process to remove contaminants:

(1) It was immersed in de-ionized water at 80° C. for 1 h;

(2) Then it was exposed to 30% $H_2O_2$ at 80° C. for 1 h;

(3) This was followed by an immersion in 85% $H_2SO_4$ at 80° C. for 1 h; and (4) Finally, the first step was repeated by heating the membrane in deionized water at 80° C. for 1 h.

2.2 Preparation of Organic Redox Active Species Solution

Catholyte solutions were prepared with 0.65 M of the following organic redox active species:

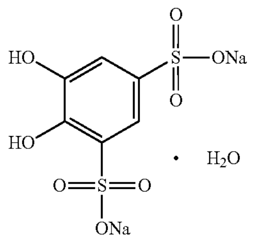

(4,5-Dihydroxy-1,3-benzenedisulfonic acid disodium salt monohydrate; hereinafter referred to as "BQDS"; available from Sigma-Aldrich; 97% assay) in 1 M sulphuric acid (utilising "Ultrapure" water from a Millipore Milli-Q water purification system <18.2 MΩ $cm^{-1}$).

2.3 Experimental Methodologies

Rotating Disk Electrode (RDE) techniques were performed using a mirror polished glassy 5 mm diameter carbon disk electrode (Pine Instruments, AFE6R1 AU) equipped within a rotator (AFMSRCE). Electrochemical tests were performed using a potentiostat (Autolab, model PGSTAT20) and a three-compartment electrochemical glass cell which employed a Pt wire counter electrode. A saturated calomel reference electrode (SCE, E°=0.244 V vs. SHE at 25° C.) was used as the reference electrode, which was ionically connected to the main compartment of the electrochemical glass cell via a Luggin capillary.

Cyclic voltammetry (CV) and Linear-sweep voltammetry (LSV) experiments were performed with a 1 mM BQDS solution in 1 M $H_2SO_4$ electrolyte. The rotation rates were from 500 rpm to 3000 rpm. CV scan rates were from 10 mV $s^{-1}$ to 200 mV $s^{-1}$. LSV scan rate was 5 mV $s^{-1}$.

Electrochemical Impedance Spectroscopy (EIS) measurements were conducted in the range of 300 mHz to 10 kHz by Gamry (Reference 3000, potentiostat mode). The electrolyte was flowed through the RFC 15 min before the measurement to infiltrate the graphite felt electrode and stabilize the electrolyte interface for the electrochemical reaction. The high frequency resistance at 10 kHz was also measured in the discharge polarization curves at various current densities. Open circuit potential (OCP) measurements were conducted before the charge and discharge test in potentiostatic mode.

2.3 System Testing

The solubility of BQDS was determined as 0.65 M, which enables higher theoretical energy density that that of a hydroquinone system (0.5 M). Solubility of BQDS (white powder at room temperature and pressure) was determined by a gravimetric method upon dissolving a known quantity of the electrolyte in a known quantity of sulfuric acid. Once precipitation was observed, the solubility was noted.

Its standard electrochemical potential (0.86 V vs SHE) was determined from CV experiments and found to be higher than that of the (ferrocenylmethyl)trimethylammonium chloride (Fe-NCL) system (0.67 V vs SHE). Hydroquinone also had an identical potential as Fe-NCL but the solubility of the latter was very high (4 M).

Example 7: Rotating Disk Electrode Measurements

Figure 9:
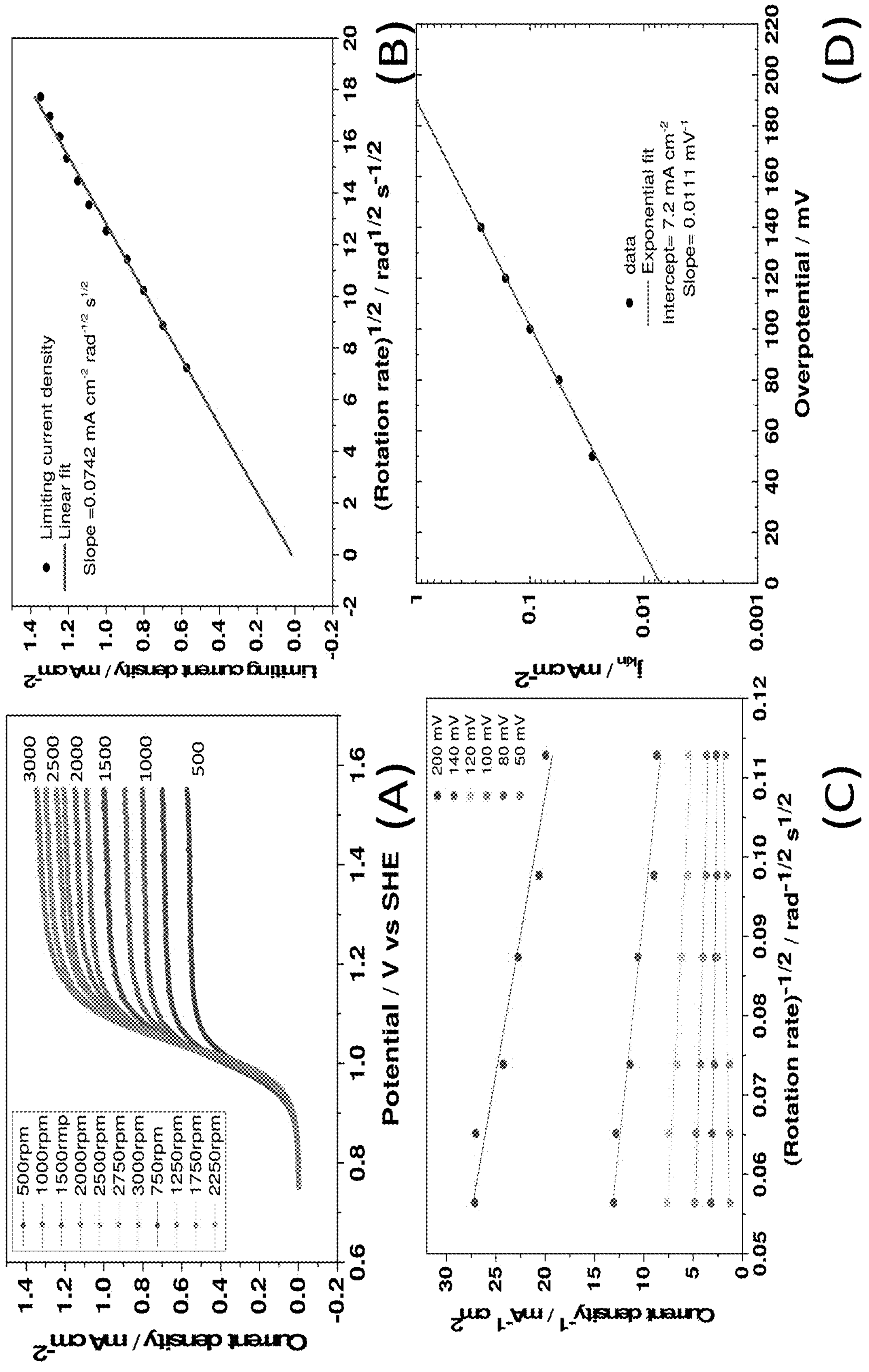
FIG. 9 shows (A) Linear-sweep voltammetry; (B) Levich plot; (C) Koutecký-Levich plot; and (D) Tafel plot for an organic redox active species/hydrogen redox flow battery.

FIG. 9. illustrates:

(A) Linear-sweep voltammetry at a scan rate of 5 mV $s^{-1}$ with RDE (glassy carbon) in 1 M $H_2SO_4$ containing 1 mM BQDS. Rotation rate increased from 500 to 3000 rpm.

(B) Levich plot of the square root of rotation rate vs the limiting current for BQDS.

(C) Koutecký-Levich plot for different overpotentials. (Top-to-bottom ordering of lines in the legend corresponds to top-to-bottom ordering of lines as seen from the left-hand side of the graph.)

(D) Tafel plot of overpotential vs log(kinetic current density).

The diffusion coefficients of both species ($5.03\times10^{-6}$ for hydroquinone and $3.74\times10^{-6}$ $cm^2$ $s^{-1}$ for Fe-NCL) were also lower than that of BQDS ($5.15\times10^{-6}$ $cm^2$ $s^{-1}$—determined from LSV as shown in FIGS. 9A and 9B). In this regard, the BQDS species has faster diffusion coefficient than those of vanadium ($1.41\times10^{-6}$ $cm^2$ $s^{-1}$) and TEMPO ($7.00\times10^{-8}$ $cm^2$ $s^{-1}$). However, the electrochemical potentials of vanadium (1.01 V vs SHE) and TEMPO (0.90 V vs SHE) are higher. The charge transfer coefficient of BQDS (0.34), determined from Koutecký-Levich plots (FIG. 9C) and the Tafel plot in FIG. 9D, was the lowest amongst TEMPO (0.68) and hydroquinone (0.51). Hence, the rate constant for BQDS is low, despite being compensated by its rapid diffusion to the active electrode surface.

From the Koutecký-Levich plot in FIG. 9C, it is seen that for the set of current densities sampled at different potentials their intercepts on the vertical axis (corresponding to infinite rotation rate) are non-zero. This confirms that BQDS has kinetic limitations as confirmed from the charge transfer coefficients reported in the preceding paragraph (determined from the kinetic current from the Koutecký-Levich equation and also from the exchange current density obtained via the Tafel plot shown in FIG. 9D).

A high redox potential of the positive redox material will lead to a high cell voltage directly when coupled with the appropriate anolyte. Amongst the organic redox materials reported in the literature, the redox potential of BQDS is relatively high and this may mean that applying an electrode with a large surface area/porosity in a high concentration of electrolyte is expected to result in high current and power densities. As a consequence, this redox species was coupled with the hydrogen evolution/oxidation reaction that is being studied in the literature for RFC applications.

The hybrid RFC single cell was assembled as described in the section 2.1 above and was tested under galvanostatic conditions at deep depths of discharge (DoD) unlike other organic systems that were evaluated using a large number of shallow cycles. An advantage is the ability of the RFB to be operated reversibly at deep DoDs and its rapid response times. Shallow cycling operations do not represent an appropriate figure of merit appropriate for evaluating RFB technology suitably. It was aimed to deliver a representative performance metric for the $H_2$/BQDS system.

Example 8 Charge/Discharge Cycles and Cyclability/Longevity Studies

Figure 10:
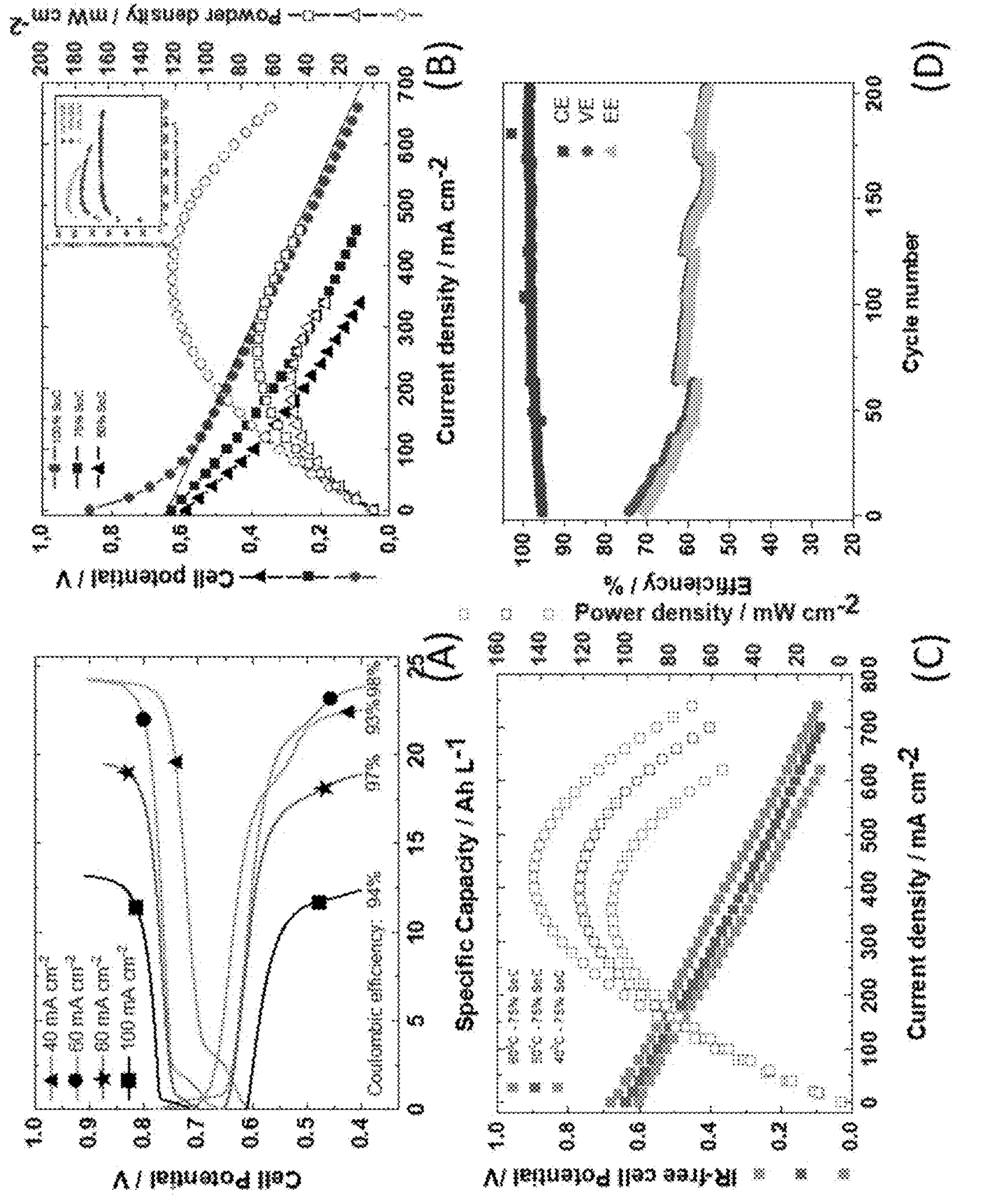
FIG. 10 shows (A) Charge and discharge curve; (B) and (C) Polarization curves; (D) Cycling efficiency vs cycle number for an organic redox active species/hydrogen redox flow battery.

FIG. 10. Illustrates:

(A) Charge and discharge curve of a 0.65 M BQDS/hydrogen RFC. 2.6 mm carbon felt was used for the BQDS half-cell.

(B) Polarization curves of $BQDS/H_2$ RFC with 0.65 M BQDS in 1 M $H_2SO_4$ solution, at 50%, 75%, 100% SOC. The inset (see FIG. 11) shows the resistance of $BQDS/H_2$ RFC, as a function of the discharge current density. 2.6 mm carbon felt was used for BQDS half-cell.

(C) Polarization curves of the $BQDS/H_2$ RFC with 0.65 M BQDS in 1 M $H_2SO_4$ solution, SOC=100%, T=40° C., 50° C., 60° C. (Top-to-bottom ordering of lines in the legend corresponds to top-to-bottom ordering of lines as seen from the right-hand side of the graph, for both datasets.)

(D) Cycling efficiency vs cycle number. CE=coulombic, VE=voltaic and EE=energy efficiencies at a constant charge/discharge current density of 100 mA $cm^{-2}$. BQDS total electrolyte volume=200 ml. RFC used a 4.6 mm carbon felt for the BQDS half-cell. (Top-to-bottom ordering of lines in the legend corresponds to top-to-bottom ordering of lines as seen from the left-hand side of the graph.)

Figure 11:
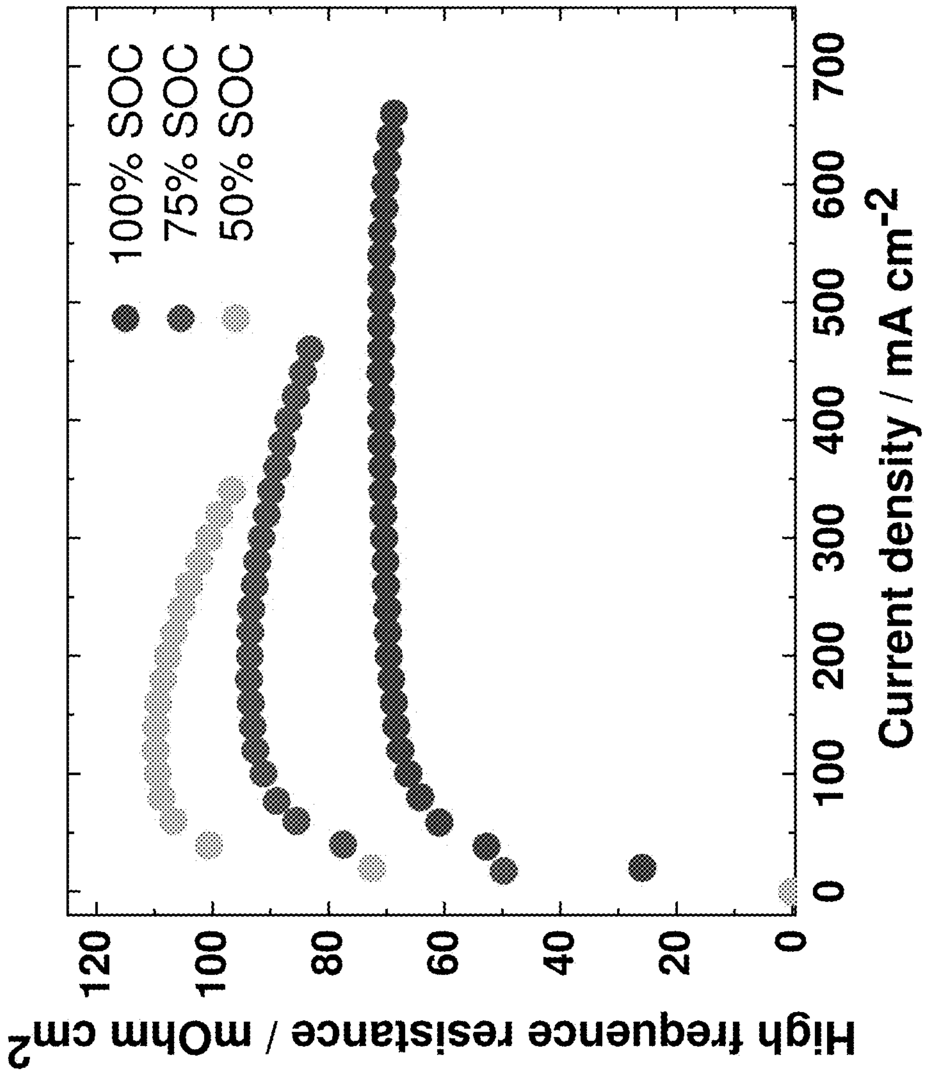
FIG. 11 shows an inset from FIG. 10B.

The inset from FIG. 10B is reproduced as FIG. 11. (Top-to-bottom ordering of lines in the legend corresponds to bottom-to-top ordering of lines as seen from the right-hand side of the graph.)

All graphs were produced using 200 ml BQDS liquid electrolyte at a constant flow rate of 50 mL $min^{-1}$ and hydrogen flow rate of 100 mL $min^{-1}$ During cycling experiments (FIG. 10D), the cell was charged and discharged for 200 times at 100 mA $cm^{-2}$, achieving an average current efficiency of 95% and an average energy efficiency of 61%. The maximum charge capacity and energy density were 13.98 Ah $L^{-1}$ and 10.90 Wh $L^{-1}$ respectively. Key factors governing the operation of an organic RFB include charge transfer and mass transport processes, operating cell voltage, faradaic efficiency, reactivity and long-term cycling. In general, the low voltage, the low energy density, and the short lifetime are the primary challenges for the RFB system applying organic redox couples. In this aspect, the $H_2$/BQDS system of the present application may surpass the performance of other aqueous-organic systems previously reported.

The $H_2$/BQDS system may be comparable to anthraquinone disulfonate (AQDS)/$Br_2$ systems in terms of cell voltage and energy density, whereas the performance of the $H_2$/BQDS system may be reproducible over 200 cycles in comparison to only 10 for the latter. The $H_2$/BQDS system may not face catalyst poisoning issues related to crossover of active species as for the AQDS/$Br_2$ flow battery, thereby allowing the generation of good faradaic efficiencies over 200 cycles with minimal capacity losses. In comparison to other organic couples tested in flow systems, the $H_2$/BQDS system may provide improved performance in terms of important figures of merit such as energy and current densities. The $H_2$/BQDS system may show poorer cell voltage in comparison to $PbSO_4$/BQDS and MV/4-HO-TEMPO. Hence, the $H_2$/BQDS system may be understood to be durable and worthy of consideration for practical scaling-up opportunities despite suffering from a low practical cell voltage.

In addition, the current efficiencies under four different current densities (for single charge/discharge cycles only) may be more than 90%, which indicates the reversibility of the BQDS (FIG. 10A) with minimal effect of side reactions. This effect is well noted for the fact that at a current density of 60 mA $cm^{-2}$, the capacity utilisation was the same, if not better (for the discharge curve in particular), than charge and discharge performed at 40 mA $cm^{-2}$ (FIG. 10A). The energy efficiency of 67% at 100 mA $cm^{-2}$ may be better than other organic RFB systems that operate normally at 50 mA $cm^{-2}$ or even at lower current densities. In general, the cell may have a better performance at low current densities with respect to the utilization and the consumption of the redox active material. However, the battery output power may be low when it is operated at low current densities. So, there is a trade-off between the power density and the efficiency.

To determine the power density of the BQDS and hydrogen RFC and to find out the maximum power output condition, cell charge and discharge was conducted at different current densities (FIG. 10) and different states of charge (SOC, defined in equation 2).

$$SOC=(\text{Discharge capacity}/\text{Maximum capacity})\times 100\% \quad (2)$$

The iR potential loss was calculated by multiplying the current (i) with the ohmic resistance value ($Z_{real}$) determined from impedance data at 10 kHz (60-110 mΩ $cm^2$ depending on state of charge). The iR-free potential is the sum of discharge cell voltage ($E_{cell}$) and the iR potential loss (equation 3).

$$iR\text{-free potential}=E_{cell}+Z_{real}\times I \quad (3)$$

The iR-potential correction was carried out to compare the mass transport with the kinetic limitations without consideration of the ohmic loss.

As shown in FIG. 10, the potential loss is mainly from kinetic effects when the current density is lower than 60 mA $cm^{-2}$. For the combination of BQDS and hydrogen redox couples, the hydrogen reaction catalysed by platinum is much faster than BQDS. Therefore, to obtain faster reaction kinetics of BQDS, we operated the cell discharge at higher temperatures. As shown in FIG. 10C, when the cell is operated at temperatures higher than 40° C. (or equal), the I-V curve is very linear at all current densities, which means the ohmic loss may contribute to the major potential loss of the cell. As the temperature increases, the cell is able to reach a higher power density with less potential loss at 75% SoC.

In general, the peak power density at room temperature is about 122 mW $cm^{-2}$ (iR free value is almost double as shown in FIG. 10C) while the redox material is fully charged as shown in FIG. 10B.

The invention claimed is:

1. A redox flow battery comprising a gaseous anolyte, an anode, a cathode, and, as a liquid catholyte, an organic redox active species having at least one electron directing moiety, wherein the organic redox active species is not unsubstituted parabenzoquinone;

wherein the gaseous anolyte is a hydrogen anolyte and a $2H+^{+}2e^{-} \rightleftharpoons H_2$ (gas) redox reaction takes place at the anode;

wherein an $X^{n+m}+me^{-} \rightleftharpoons X^{n}$ redox reaction takes place at the cathode, wherein $X^{n+m}$ is the organic redox active species, $X^{n}$ is spent organic redox active species and m is an integer; and wherein the redox flow battery is a reversible flow battery configured to operate in a power delivery mode in which it generates electrical power by the reaction of redox active species and in an energy storage mode in which it consumes electrical power to generate said redox active species.

2. The redox flow battery according to claim 1, wherein the organic redox active species is selected from a carbocyclic compound, a heterocyclic compound, a polymer, a dendrimer, a dendron and a metallocene.

3. The redox flow battery according to claim 1, wherein the organic redox active species is selected from an optionally substituted polythiophene, polyaniline or polypyrrole.

4. The redox flow battery according to claim 1, wherein the organic redox active species comprises an optionally substituted moiety having the formula:

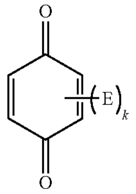
or
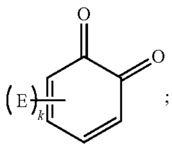
;

in which each E, independently, is an electron directing moiety; and k is 1, 2, 3 or 4.

5. The redox flow battery according to claim 4, wherein the organic redox active species comprises an optionally substituted moiety having the formula:

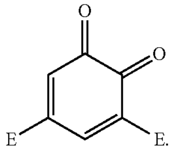

6. The redox flow battery according to claim 5, wherein the organic redox active species is optionally substituted:

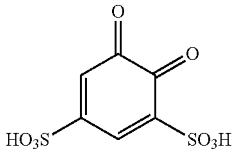
or
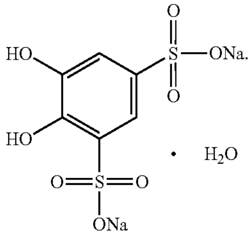

7. The redox flow battery according to claim 1, wherein the organic redox active species comprises an optionally substituted moiety having the formula:

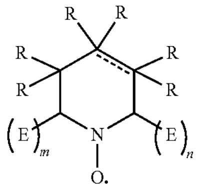
;

in which each R is independently selected from carboxylic acid (—COOH), —C(O)Oalkyl or hydrogen;

each E independently is an electron directing moiety;

is either a double or single bond;

wherein n and m are independently 0, 1 or 2; and wherein n+m is at least 1.

8. The redox flow battery according to claim 7 wherein the organic redox active species is optionally substituted:

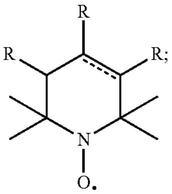

in which each R is independently carboxylic acid (—COOH), —C(O)Oalkyl or hydrogen; and is either a double or single bond.

9. The redox flow battery according to claim 1, wherein the or each electron directing moiety is an electron withdrawing group independently selected from a sulfonyl, haloalkyl, cyano, sulfonate, nitro, ammonium, carbonyl, carboxylic acid, acyl halide, C-linked ester, C-linked amide or a halide group.

10. The redox flow battery according to claim 1, wherein the or each electron directing moiety is an electron donating group independently selected from a phenoxide, amine, ether, phenol, N-linked amide, O-linked ester, alkyl, phenyl or a vinyl group.

11. The redox flow battery according to claim 10, wherein the or each electron donating group is, independently, an optionally substituted alkyl group.

12. The redox flow battery according to claim 1, wherein:

the catholyte comprises an acid; and the catholyte has a pH of at most about 6.

13. The redox flow battery according to claim 1, wherein:

the catholyte comprises an alkali; and the catholyte has a pH of at least about 7.

14. The redox flow battery according to claim 1, comprising an ion exchange membrane.

15. The redox flow battery according to claim 1, wherein the redox flow battery comprises at least one of a graphitic anode or cathode.

16. The redox flow battery according to claim 1, wherein the anode comprises platinum, palladium, iridium, ruthenium, rhenium, rhodium, osmium, or combinations thereof.

17. The redox flow battery according to claim 1, wherein m is selected from 1 and 2.

18. A redox flow battery comprising a gaseous anolyte, an anode, and, as a liquid catholyte, an organic redox active species having at least one electron directing moiety, wherein:

the organic redox active species is not unsubstituted parabenzoquinone;

the gaseous anolyte is a hydrogen anolyte and a $2H^{+}+2e^{-}=H_2$ (gas) redox reaction takes place at the anode; and the redox flow battery is a reversible flow battery configured to operate in a power delivery mode in which it generates electrical power by the reaction of redox active species and in an energy storage mode in which it consumes electrical power to generate said redox active species.

19. A method of use of a catholyte in a redox flow battery comprising a hydrogen anolyte as a gaseous anolyte and an anode and a cathode, the method comprising:

providing an organic redox active species having at least one electron directing moiety, wherein the organic redox active species is not unsubstituted parabenzoquinone, as a liquid catholyte;

incorporating the liquid catholyte into the redox flow battery;

performing a $2H+^{+}2e^{-} \rightleftharpoons H_2$ (gas) redox reaction at the anode; and performing an $X^{n+m}+me^{-} \rightleftharpoons X^{n}$ redox reaction at the cathode, wherein $X^{n+m}$ is the organic redox active species, X" is spent organic redox active species and m is an integer;

wherein the redox flow battery is a reversible flow battery configured to operate in a power delivery mode in which it generates electrical power by the reaction of redox active species and in an energy storage mode in which it consumes electrical power to generate said redox active species.

20. A redox flow battery comprising a gaseous anolyte, an anode, a cathode, and, as a liquid catholyte, an organic redox active species having at least one electron directing moiety, wherein:

the organic redox active species is not unsubstituted parabenzoquinone;

the gaseous anolyte is a hydrogen anolyte and a $2H+^{+}2e^{-}=H_2$ (gas) redox reaction takes place at the anode;

the redox flow battery comprises a catholyte compartment comprising the cathode, wherein the redox flow battery is configured to enable removal of gaseous anolyte from the catholyte compartment;

the redox flow battery comprises an anolyte compartment comprising the anode, wherein the redox flow battery is configured to enable removal of liquid catholyte from the anolyte compartment; and the redox flow battery is a reversible flow battery configured to operate in a power delivery mode in which it generates electrical power by the reaction of redox active species and in an energy storage mode in which it consumes electrical power to generate said redox active species.

* * * * *